US010488996B2

(12) United States Patent
Rosenberg et al.

(10) Patent No.: US 10,488,996 B2
(45) Date of Patent: Nov. 26, 2019

(54) SYSTEM FOR DETECTING AND CONFIRMING A TOUCH INPUT

(71) Applicant: Sensel Inc., Mountain View, CA (US)

(72) Inventors: Ilya Daniel Rosenberg, Mountain View, CA (US); John Aaron Zarraga, Mountain View, CA (US)

(73) Assignee: Sensel, Inc., Mountain View, CA (US)

( * ) Notice: Subject to any disclaimer, the term of this patent is extended or adjusted under 35 U.S.C. 154(b) by 203 days.

(21) Appl. No.: 15/599,365

(22) Filed: May 18, 2017

(65) Prior Publication Data
US 2017/0336891 A1 Nov. 23, 2017

Related U.S. Application Data

(60) Provisional application No. 62/338,439, filed on May 18, 2016.

(51) Int. Cl.
G06F 3/044 (2006.01)
G06F 3/041 (2006.01)
G06F 3/045 (2006.01)
G06F 3/042 (2006.01)

(52) U.S. Cl.
CPC .............. *G06F 3/044* (2013.01); *G06F 3/045* (2013.01); *G06F 3/0412* (2013.01); *G06F 3/0414* (2013.01); *G06F 3/0416* (2013.01); *G06F 3/0418* (2013.01); *G06F 3/0421* (2013.01); *G06F 3/04144* (2019.05); *G06F 2203/04104* (2013.01); *G06F 2203/04106* (2013.01)

(58) Field of Classification Search
CPC ...... G06F 3/044; G06F 3/0421; G06F 3/0418; G06F 3/0412; G06F 3/0416; G06F 3/0414; G06F 3/04144; G06F 3/04146; G06F 3/045; G06F 2203/04106; G06F 2203/04104
See application file for complete search history.

(56) References Cited

U.S. PATENT DOCUMENTS

| 6,504,530 | B1 | 1/2003 | Wilson et al. |
| 2009/0020343 | A1 | 1/2009 | Rothkopf et al. |
| 2010/0097355 | A1 | 4/2010 | Jang et al. |
| 2014/0210791 | A1 | 7/2014 | Hanauer et al. |
| 2015/0309660 | A1 | 10/2015 | Lee et al. |

(Continued)

*Primary Examiner* — Rodney Amadiz
(74) *Attorney, Agent, or Firm* — Run8 Patent Group, LLC; Peter Miller

(57) ABSTRACT

One variation of a method includes: defining a first capacitance gradient of capacitance thresholds spanning a capacitive touch sensor; defining a first pressure gradient of pressure thresholds spanning a pressure sensor; reading a capacitance value from the capacitive touch sensor proximal a first location; detecting presence of a first input at the first location in response to the capacitance value exceeding a capacitance threshold assigned to the first location; reading a pressure value from the pressure sensor proximal the first location; detecting presence of a second input proximal the first location in response to the pressure value exceeding a pressure threshold; in response to detecting the first input and detecting the second input: merging the first input and the second input into a confirmed touch input; and generating a first touch image representing the first location and the pressure value of the confirmed touch input.

21 Claims, 7 Drawing Sheets

(56) References Cited

U.S. PATENT DOCUMENTS

2015/0378491 A1   12/2015  Worfolk et al.
2016/0098185 A1    4/2016  Xiao et al.
2018/0188874 A1*   7/2018  Cho .......................... G01L 1/14

* cited by examiner

SYSTEM FOR DETECTING AND CONFIRMING A TOUCH INPUT

CROSS-REFERENCE TO RELATED APPLICATIONS

This Application claims the benefit of U.S. Provisional Application No. 62/338,439, filed on 18 May 2016, which is incorporated in its entirety by this reference.

This Application is related to U.S. patent application Ser. No. 15/224,003, filed on 29 Jul. 2016; U.S. patent application Ser. No. 15/223, 968, filed on 29 Jul. 2016; U.S. patent application Ser. No. 15/470,669, filed on 27 Mar. 2017; and U.S. patent application Ser. No. 15/476,732, filed on 31 Mar. 2017, all of which are incorporated in their entireties by this reference.

TECHNICAL FIELD

This invention relates generally to the field of touch sensors and more specifically to a new and useful system for detecting and confirming a touch input in the field of touch sensors.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 8:
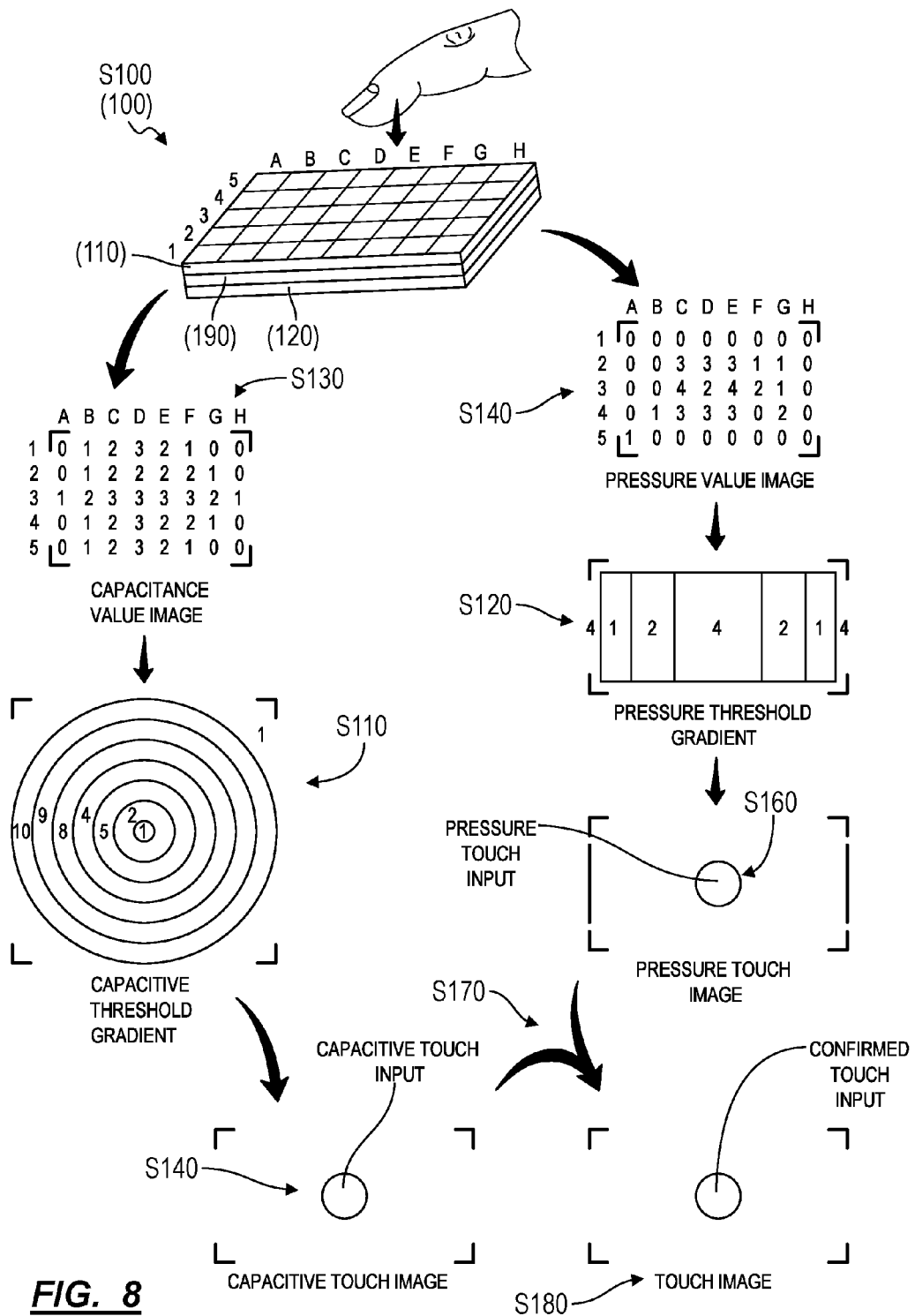
FIG. 8 is a flowchart representation of one variation of the method.
Figure 10:
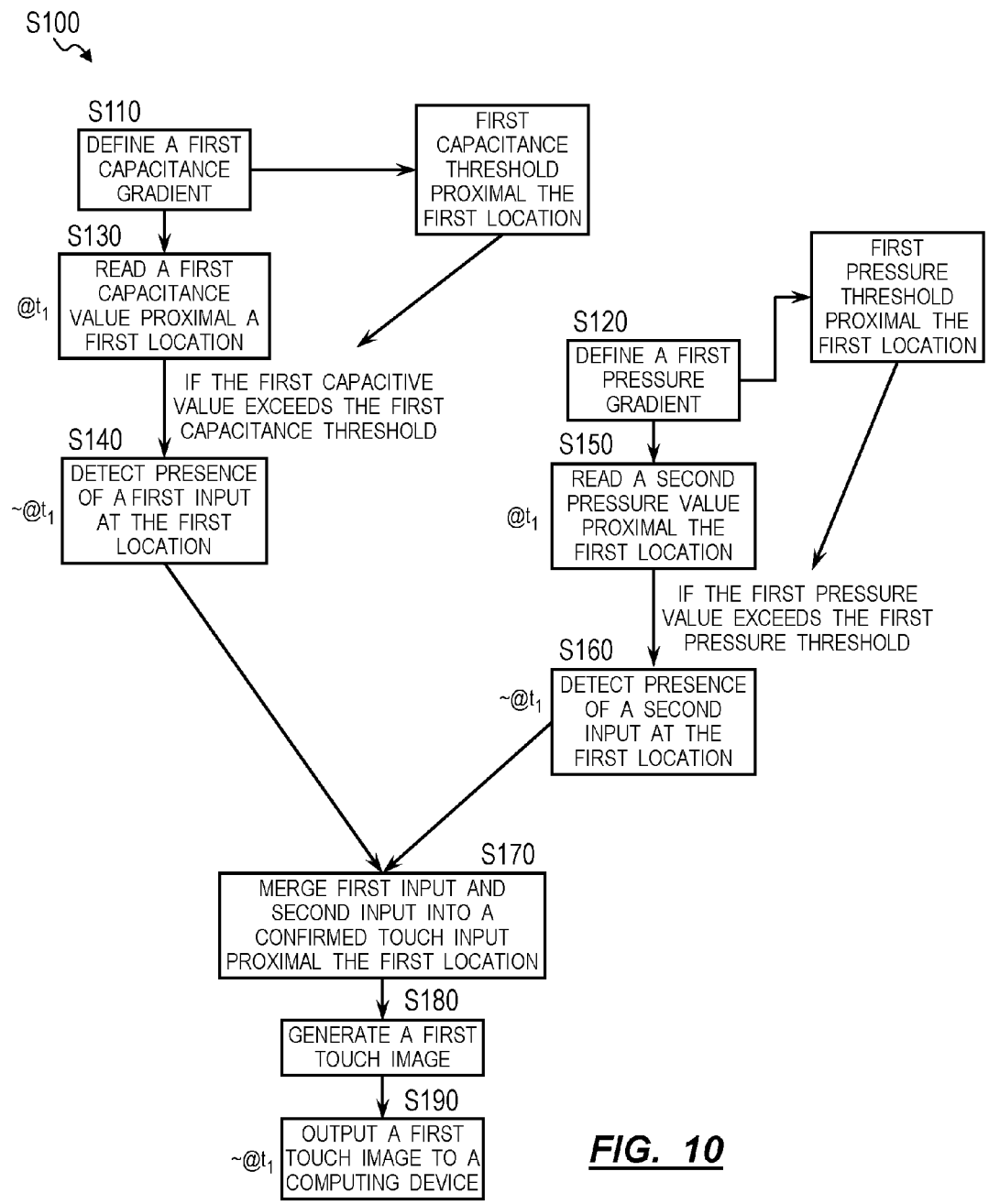
FIG. 10 is a flowchart representation of one variation of the method.

As shown in FIGS. 8 and 10, a method S100 for detecting an input to a surface of a computing device includes: defining a first capacitance gradient of capacitance thresholds spanning a sense array of a capacitive touch sensor 110 in Block S110; defining a first pressure gradient of pressure thresholds spanning a sense array of a pressure sensor 120 coupled to the capacitive touch sensor 110 in Block S120; through the capacitive touch sensor: reading a first capacitance value from a first capacitive sense electrode 116 in the sense array of the capacitive touch sensor 110 proximal a first location on a touch sensor surface 150 at a first time in Block S130; detecting presence of a first input on the touch sensor surface 150 at the first location at the first time in response to the first capacitance value exceeding a first capacitance threshold assigned to the capacitive touch sensor 110 proximal the first location by the first capacitance gradient in Block S140; through the pressure sensor: reading a second pressure value from a first resistive sense electrode 126 in the sense array of the pressure sensor 120 proximal the first location on the touch sensor surface 150 at approximately the first time in Block S150; detecting presence of a second input on the touch sensor surface 150 proximal the first location at approximately the first time in response to the second pressure value exceeding a first pressure threshold assigned to the pressure sensor 120 proximal the first location by the first pressure gradient in Block S160; and in response to detecting the first input at the first location at the first time and detecting the second input proximal the first location at approximately the first time: merging the first input and the second input into a confirmed touch input proximal the first location on the touch sensor surface 150 in Block S170; generating a first touch image representing the first location and the second pressure value of the confirmed touch input in Block S180; and outputting the first touch image to a computing device at approximately the first time in Block S190.

Figure 7:
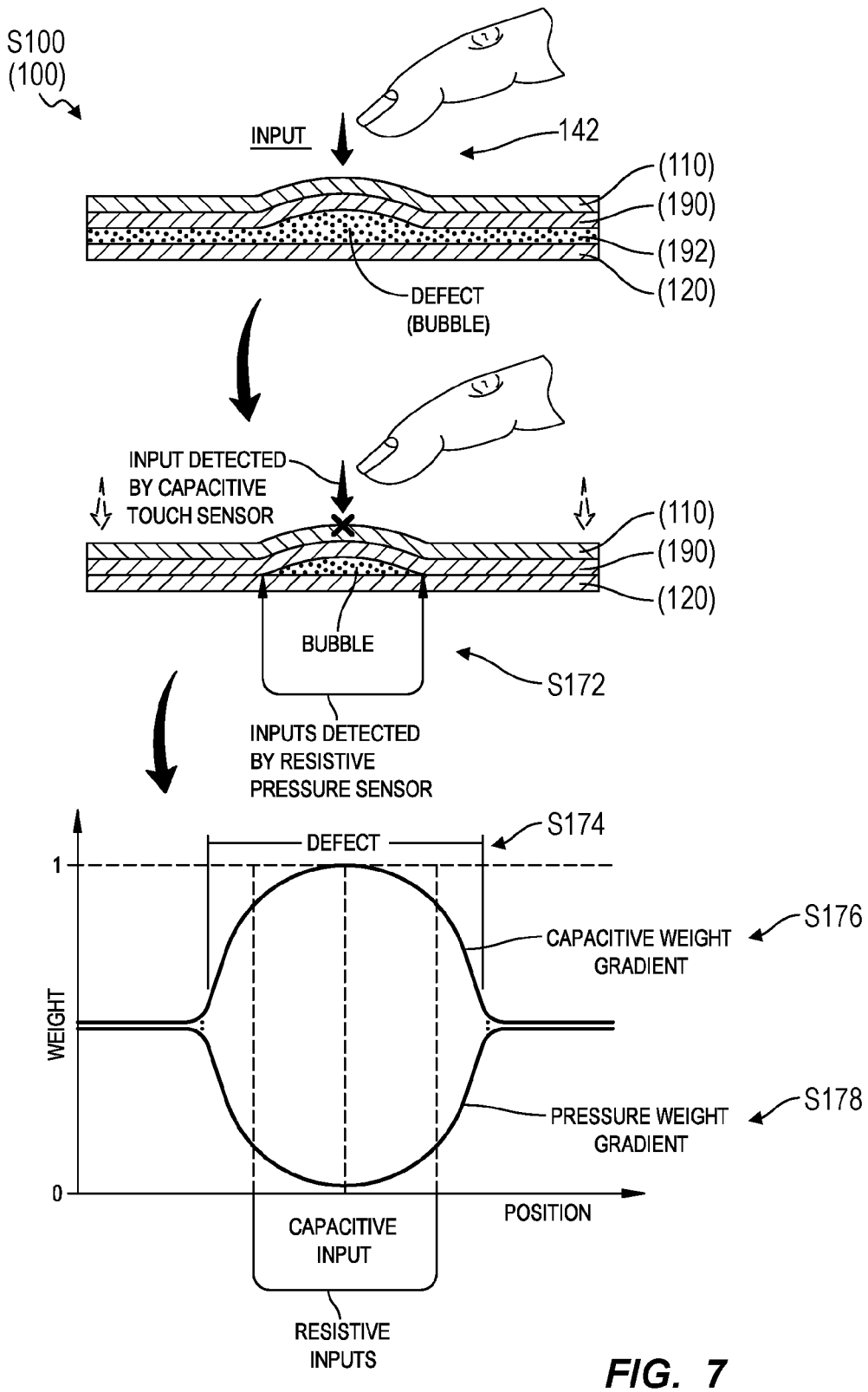
FIG. 7 is a flowchart representation of one variation of a method.
Figure 9:
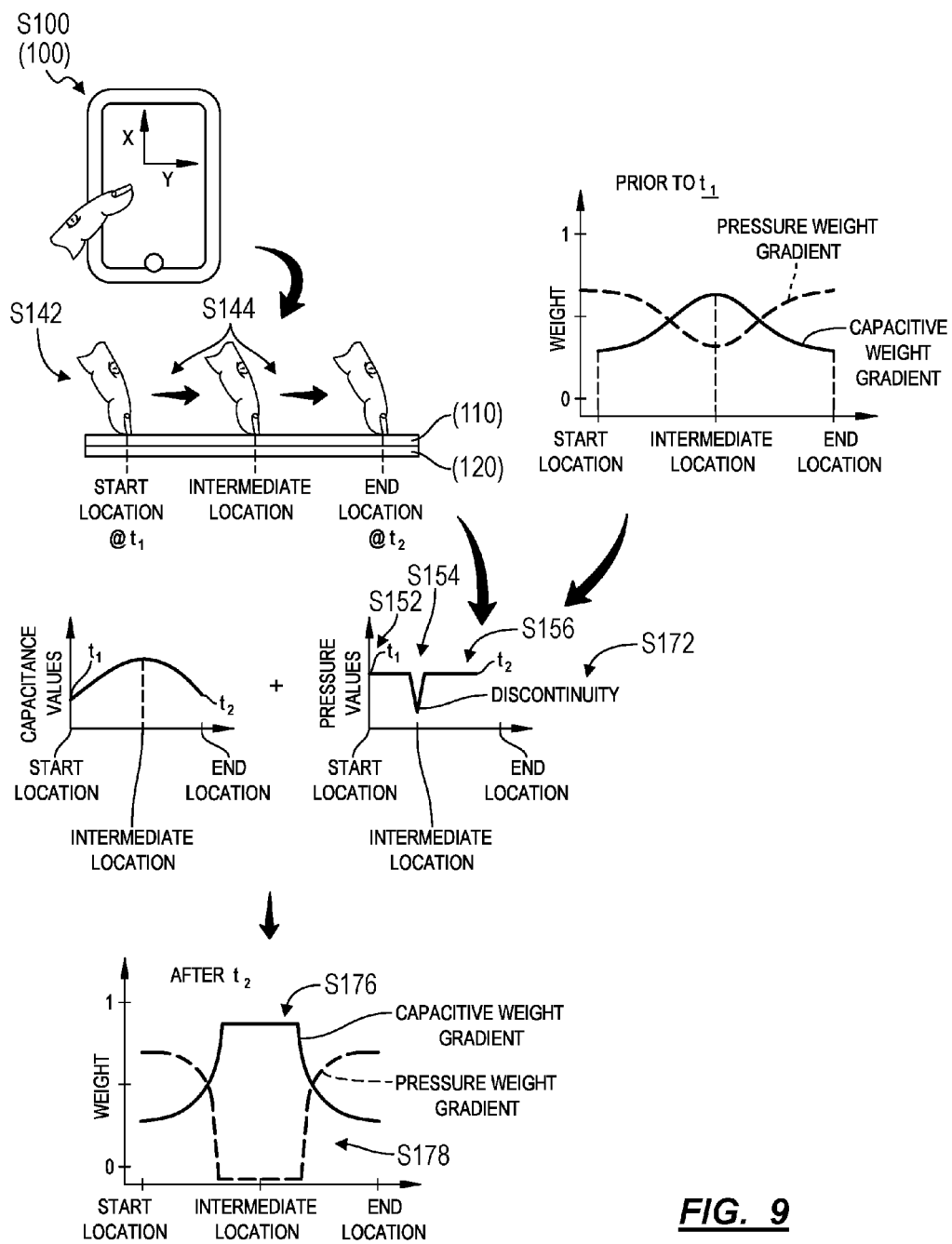
FIG. 9 is a flowchart representation of one variation of the method.

As shown in FIGS. 7 and 9, a variation of the method includes: through a capacitive touch sensor: detecting presence of an input at a start location over a touch sensor surface 150 at a first time in Block S142; detecting a transition of the input from the start location, through an intermediate location, to an end location over a contiguous path on the touch sensor surface 150 over a duration of time, the end location offset from the start location, the duration of time terminating at a second time succeeding the first time in Block S144; through a pressure sensor 120 coupled to the capacitive touch sensor: detecting a start pressure applied to the touch sensor surface 150 proximal the start location at approximately the first time in Block S152; detecting an intermediate pressure applied to the touch sensor surface 150 proximal the intermediate location in Block S154; detecting an end pressure applied to the touch sensor surface 150 proximal the end location at approximately the second time in Block S156; detecting a discontinuity in magnitude of pressure applied to the touch sensor surface 150 proximal the intermediate location based on the start pressure, the intermediate pressure, and the end pressure in Block S172; in response to detecting the discontinuity: associating a first region of the pressure sensor 120 adjacent the intermediate location with a mechanical defect in Block S174; increasing a first weight assigned to inputs detected through the capacitive touch sensor 110 proximal the intermediate location in Block S176; decreasing a second weight assigned to pressures detected by the pressure sensor 120 proximal the intermediate location in Block S178; and, at a third time, confirming a second input proximal the intermediate location based on the second input detected by the capacitive touch sensor 110 weighted according to the first weight and based on a second pressure detected by the pressure sensor 120 proximal the intermediate location weighted according to the second weight in Block S170.

2. Applications

Generally, the method S100, can be implemented by a system 100 including a pressure sensor 120 and a capacitive touch sensor 110 integrated into a keyboard, trackpad, mouse, touchscreen, or other computing device or peripheral input device to detect and confirm an input. In particular, the system 100 can include a set of discrete sensors, each configured to detect an input on a common touch sensor surface 150 via unique (to the set) sensing modalities and each exhibiting unique (to the set) noise modes. By comparing data collected by each sensor in the set, the computing device can implement method S100, to collect redundant input data and to detect and confirm an input on the touch sensor surface 150 based on these redundant input data. Through collection of redundant input data, the method S100, can improve reliability and accuracy of input detection on a touch sensor surface 150 and enhance robustness of the system 100 implementing method S100, over systems depending on a single sensor to detect and confirm inputs in various situations. For example, the method S100, may be implemented by computing devices for use in military and surgical applications to reliably and accurately detect inputs on a touch sensor surface 150.

In particular, Blocks of the method S100 can be executed on a computing device including a resistive pressure sensor 120 and a capacitive touch sensor 110 coupled to (e.g., arranged over) the resistive pressure sensor 120. In one application, the computing device can include a touchpad (or trackpad) with a capacitive touch sensor 110 arranged under a touch sensor surface 150 and a resistive pressure sensor 120 under the capacitive touch sensor 110. In another application, the computing device can include a display interposed between the pressure and capacitive touch sensors to form a pressure-sensitive touchscreen. For example, the touchscreen can include a display, a resistive pressure sensor 120 arranged under the display, and a capacitive touch sensor 110 arranged over the display 190 opposite the resistive pressure sensor 120. However, Blocks of the method S100 can be executed by any other computing device or controller including a touch sensor surface 150 accessible by a user and including a plurality of sensor layers, each sensor layer cooperating with other sensor layers to detect and confirm inputs to the touch sensor surface 150.

In one example of the foregoing applications, a touchpad can be designed to be a rugged and robust touch interface for a computer designed to detect and confirm inputs accurately and reliably in a variety of situations and a variety of environments that can adversely affect function of individual sensors within the touchpad. In this example, by implementing Blocks of the method S100, the touchpad can function reliably and with accuracy despite unfavorable conditions for one type of sensor in the touchpad through reprioritization (or "weighting") and/or adjustment of sensitivity of another type of sensor in the touchpad. For example, the rugged touchpad touch sensor surface 150 can be sprayed with water such that water pools across the touch sensor surface 150, which can interfere with capacitance values detected by the capacitive touch sensor 110. In this example, the rugged touchpad can increase sensitivity and priority of inputs detected by the resistive pressure sensor 120 and nullify any inputs detected by the capacitive touch sensor 110. Thus, the rugged touchpad can be implemented in a computing device for in-field military applications, surgical applications, and/or other extreme environments in which reliable and accurate inputs are desired but environmental conditions limit precise function of a particular type of sensor in the computing device In another of the foregoing applications of method S100, Blocks of the method S100 can be executed to improve accuracy of inputs detected on a touch sensor surface 150 (e.g., within a touchpad or touchscreen) and optimize resource load required by the computing device to detect and handle these inputs by generating and applying a map of sensor priorities (e.g., a "weight gradient") and/or a map of sensor input thresholds (e.g., a "threshold gradient") varying across regions of the touch sensor surface 150 based on types of inputs and/or effectiveness of these sensors at each of these regions on the touch sensor surface 150. For example, the computing device can implement Blocks of the method S100 to tune sensitivity thresholds of the capacitive sensor to detect inputs with lower capacitance values (e.g., lower deviations from baseline capacitance values) in discrete locations where the capacitive sensor may be less accurate or capacitive inputs may be more difficult for a user to apply (i.e., near a bevel at an edge of a touchscreen), thereby improving the system's ability to detect capacitive inputs at these discrete locations. The computing device can also implement Blocks of the method S100 to increase sensitivity thresholds of the capacitive sensor to detect inputs with higher capacitance values in discrete locations where the capacitive sensor may be less accurate. Additionally, the computing device can lower sensitivity thresholds of the pressure sensor 120 in these discrete locations to detect inputs applying lower pressure values to the touch sensor surface 150 (and the pressure sensor), improving the system's ability to detect pressure inputs at these discrete locations. Furthermore, the pressure sensor 120 and the capacitive touch sensor 110 (or other sensor combinations) can cooperate to detect static or dynamic defects in these sensors and to locally (or globally) compensate for these defects over time.

3. Examples

In one example of the method S100, a mobile computing device (e.g., a smartphone) can implement Blocks of the method S100 to provide a failsafe for identifying incidental (or accidental) inputs to the touch sensor surface 150. In this example, Blocks of the method S100 function as a "false-positive" test for detecting events at the touch sensor surface 150 inaccurately output as a "positive" input by a single sensor in the device. For example, a user holding a mobile phone may place a finger at a particular location proximal an edge of a touchscreen of the device. A capacitive touch sensor 110 integrated into the touchscreen of the device can read capacitance values from capacitive sense electrodes 116 near the finger at the particular location. In response to these capacitance values exceeding a preset capacitance threshold (e.g., deviating from a baseline capacitance value for this sampling period by more than the preset capacitance threshold) assigned to the particular location on the touchscreen, the capacitive touch sensor 110 can identify a capacitive input at the particular location. However, at approximately the same time, the pressure sensor 120 can read pressure values (e.g., electrical resistance values) from resistive sense electrodes 126 near the particular location, which may fall below a preset pressure threshold for detecting pressure inputs proximal the particular location. By merging the pressure values with the capacitive values, the system 100 can nullify the capacitive input detected by the capacitive touch sensor 110 responsive to lack of confirmation of the input near the particular location by the pressure sensor 120 and instead characterize the input detected by the capacitive touch sensor 110 as an aberrant or accidental input.

Furthermore, in the foregoing example, the computing device can generate a capacitive sensor weight (or sensor priority) gradient in which a capacitive input detected by the capacitive touch sensor 110 at a location near an edge of a phone with a touchscreen is weighted less (i.e. is of lower priority) than a pressure input detected by the pressure sensor 120 at the location near the edge of touchscreen. Inputs detected by the pressure sensor 120 can be prioritized over inputs detected by the capacitive touch sensor 110 proximal the edge of the touchscreen. However, near a center of the touchscreen, a capacitive input can be weighted higher (i.e., of higher priority) than a pressure input detected by the pressure sensor 120 because lesser mechanical rigidity and greater deflection of the touchscreen near its center may yield less reliable collection of pressure values by the pressure sensor 120 and less reliable determination of locations of inputs on the touch sensor surface 150 via pressure values recorded by the pressure sensor 120.

In another example of method S100, a computing device can implement Blocks of the method S100, to provide a failsafe for identifying and accepting inputs that a sensor (or sensor array) of the computing device may have missed or nullified as an aberrant input. In this example, Blocks of the method S100, function as a "false-negative" test for detecting events at the touch sensor surface 150 inaccurately identified as a "negative input" or "non-input" event by a sensor in the computing device. For example, a user may attempt to unlock a mobile device, such as a smartwatch, by placing a finger on a touchscreen of the smartwatch. On a hot day, the user's finger may be moistened with sweat or water, which can interfere with capacitance values read from a capacitive touch sensor 110 in the touchscreen of the smartwatch. Due to interference from such moisture, capacitance values read from the capacitance sensor near the location of the user's finger may fall below a preset capacitance threshold for detecting an input or may fluctuate unreliably across this capacitance threshold. Thus, the computing device, through the capacitive touch sensor 110, can detect absence of or reject an input on the touch sensor as this location based on capacitance values collected by the capacitive touch sensor 110. However, at approximately the same time, the pressure sensor 120 can detect pressure values—near this location—that exceed a preset pressure threshold for detecting a pressure input. Thus, the device can override the lack of input detected by capacitive touch sensor 110 response to an input detected at the same location by the pressure sensor 120, register application of force by the user's finger on the touchscreen as an input, and then response to this input accordingly.

Additionally, as shown in FIG. 7, Blocks of the method S100, can be implemented by a device to detect and compensate for defects in and around integrated touch sensors. For example, a mobile device can include a display, a resistive pressure sensor 120 array arranged under the display, a capacitive touch sensor 110 array arranged over the display 190 opposite the resistive pressure sensor 120, and a touch sensor surface 150 arranged over the capacitive touch sensor 110. During manufacture of the touchscreen, the resistive pressure sensor 120 array can be adhered to the back side of the display; uneven distribution of adhesive 192 to bond the resistive pressure sensor 120 to the display 190 and/or non-uniform pressure applied to the resistive pressure sensor 120 to activate the adhesive 192 may cause the resistive pressure sensor 120 to be non-planar to the touch sensor surface 150 or may yield other defects, such as bubbles or wrinkles, between the resistive pressure sensor 120 and the back side of the touchscreen. Thus, when a user depresses (e.g., applies an input to) the touch sensor surface 150 at a first location directly over such a bubble or wrinkle, the touchscreen and adhesive 192 may communicate this applied force into the pressure sensor 120 predominating around but not substantially directly over the first location (i.e., not directly over the bubble). The pressure sensor 120 array may thus detect a maximum pressure increase at a location other than the center of the applied force. In particular, as the user depresses the touch sensor surface 150, the touch sensor surface 150, the capacitive touch sensor 110, and the display 190 can deflect downward toward the pressure sensor 120 without communicating an increase in force or pressure into the pressure sensor 120 at the first location. At the same time, the pressure sensor 120 can detect increased pressure proximal edges of the bubble because, as the touch sensor surface 150, the capacitive touch sensor 110, and the display 190 flex downward toward the pressure sensor 120, the display 190 depresses the resistive pressure sensor 120 at locations surrounding the bubble where the display 190 and the resistive pressure sensor 120 are properly bonded. Thus, the resistive pressure sensor 120 can detect an input—that was actually applied to the first location—at an incorrect location offset from the first location (e.g., near the edge of the bubble). By implementing method S100, the computing device can identify this defect in the resistive pressure sensor 120 proximal the first location by detecting a discrepancy in input data between capacitive touch sensor 110 output values and the pressure sensor 120 output values recorded over time as the user draws a finger across the touch sensor surface 150 and over the defect. Based on this discrepancy—such as a discontinuity in pressure detected by the pressure selector relative to capacitance values read by the capacitive touch sensor 110 over this duration—the computing device can record the first location of the resistive pressure sensor 120 as defective and nullify any pressure values detected at and near the first location in preference for input detected solely or predominantly based on capacitance values recorded at and near the first location. In particular, the computing device can compensate for this defect affecting the resistive pressure sensor 120 array at and surrounding the first location by heavily weighting capacitive inputs detected at the first location over pressure inputs detected near the first location when generating a touch image representing inputs to the touch sensor surface 150. For example, the computing device can completely neglect pressure inputs detected by the pressure sensor 120 over a first region coincident and surrounding the first location in the touch image and can exclusively manipulate capacitive inputs over the first region in the touch image once a defect is detected at the first location.

Likewise, as in the preceding example, Blocks of the method S100 can be implemented by a computing device to account for and compensate for environmental situations that can impact performance and efficacy of a touch sensor integrated into the computing device. For example, Blocks of the method S100 can be implemented in response to rapid fluctuation of capacitance values at a first location of a touchpad over a short duration of time. In response to this fluctuation, the computing device can determine presence of electrical interference hindering function of the capacitive touch sensor 110 proximal the first location of the touchpad. Such electrical interference may stem from a pool of water puddled on the touch sensor surface 150 of the touchpad or electrical noise emitted from a power cord charging the computing device and interfering with the electric field and capacitive coupling of the capacitive touch sensor no. To compensate for this electrical interference, the computing device can implement Blocks of the method S100 to lower pressure input thresholds of the pressure sensor 120 near the first location in order to increase sensitivity of the pressure sensor 120 around the first location while electrical interference interferes with capacitive values read by the capacitive touch sensor 110 near the first location. Thus, Blocks of the method S100 can function to maintain a nearly constant overall touch input sensitivity of a touch sensor surface 150 by modifying sensitivities of discrete sensors and/or weights of inputs detected by these discrete sensors within the device.

4. System

As shown in FIGS. 1-6, Blocks of the method S100 can be implemented by a system 100 (e.g., a computing device) including: a discrete pressure sensor; a discrete capacitive touch sensor 110 arranged over the pressure sensor; a touch sensor surface 150 arranged over the capacitive touch sensor; and a master controller 140 configured to confirm inputs on the touch sensor surface 150 by comparing outputs of the pressure sensor 120 and the capacitive touch sensor 110.

4.1 Pressure Sensor

Figure 1:
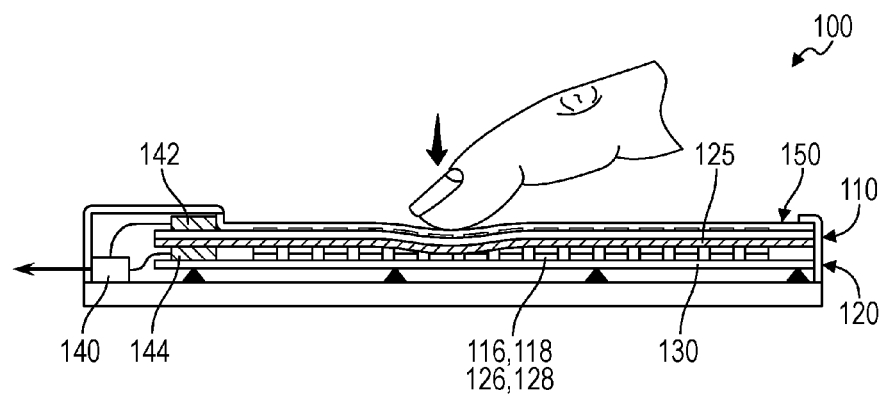
FIG. 1 is a schematic representation of a system.
Figure 2:
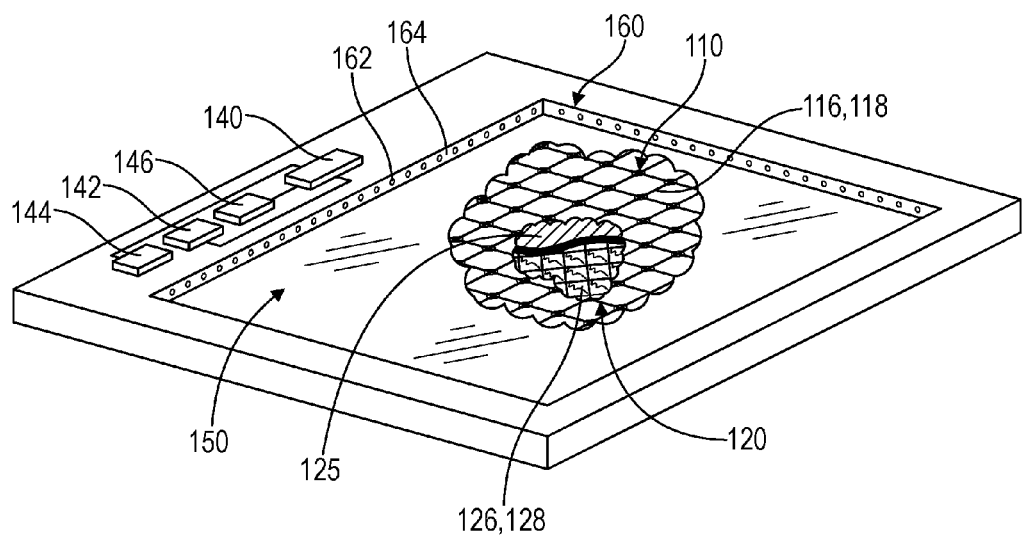
FIG. 2 is a schematic representation of one variation of the system.

As shown in FIGS. 1 and 2, a pressure sensor 120 (or resistive pressure sensor) includes: a substrate 130 (e.g., a fiberglass PCB); an array of sense electrode 126 and drive electrode 128 pairs patterned across the substrate; and a resistive layer 125 arranged over the sense electrode 126 and drive electrode 128 pairs and comprising a material exhibiting variations in local bulk and/or contact resistance responsive to variations in applied force. In one implementation, as described in U.S. patent application Ser. No. 14/499,001, the pressure sensor 120 can include: a grid of inter-digitated drive electrodes 128 and sense electrodes 126 patterned across the substrate; and the resistive layer 125 can include a material that exhibits variations in local bulk resistance responsive to variations in applied force. The resistive layer 125 can span gaps between each drive and sense electrode pair across the pressure sensor 120 such that, when a local force is applied to the resistive layer, the resistance across an adjacent drive and sense electrode pair varies proportionally (e.g., linearly, inversely, or quadratically) with the magnitude of the force applied thereover. The pressure sensor 120 can also include an integrated pressure sensor controller 144 (hereinafter "pressure sensor sub-controller") configured to: read resistance values across each drive and sense electrode pair; to transform these resistance values into both the position and the magnitude of one or more discrete force inputs applied across a surface above the resistive layer; and to output one force touch image containing such position and force magnitude data for each input detected during a single scan of the sense and drive electrodes.

Generally, the pressure sensor sub-controller 144 functions to drive the pressure sensor 120, to read resistance values between drive and sense electrodes, and to transform resistance data from the pressure sensor 120 into locations and magnitudes of force inputs over the pressure sensor 120. In one implementation, the pressure sensor sub-controller 144 includes: an array column driver (ACD); a column switching register (CSR); a column driving source (CDS); an array row sensor (ARS); a row switching register (RSR); and an analog to digital converter (ADC), as described in U.S. patent application Ser. No. 14/499,001. In this implementation, the pressure sensor 120 can include a variable impedance array (VIA) that defines: interlinked impedance columns (IIC) coupled to the ACD; and interlinked impedance rows (IIR) coupled to the ARS. During a resistance scan period: the ACD can select the IIC through the CSR and electrically drive the IIC with the CDS; the VIA can convey current from the driven IIC to the IIC sensed by the ARS; the ARS can select the IIR within the pressure sensor 120 and electrically sense the IIR state through the RSR; and the sub-controller can interpolate sensed current/voltage signals from the ARS to achieve substantially accurate detection of proximity, contact, pressure, and/or spatial location of a discrete force input over the pressure sensor 120 for the resistance scan period within a single sampling period.

4.2 Pressure Sensor+Capacitive Touch Sensor

As shown in FIG. 1, one variation of the system 100 includes: a discrete pressure sensor; a discrete capacitive touch sensor 110 (hereinafter a "capacitive touch sensor") arranged over the pressure sensor; a touch sensor surface 150 arranged over the capacitive touch sensor; and a master controller 140 configured to confirm inputs on the touch sensor surface 150 (e.g., by a finger or a stylus) by comparing outputs of the pressure and capacitive touch sensors.

In this variation, the pressure sensor 120 can define a standalone or discrete pressure sensor 120, as described above, that includes a (rigid) substrate, sense and drive resistance electrodes patterned across the substrate, a resistive layer 125 arranged over the sense and drive electrodes, and a pressure sensor sub-controller 144 that outputs one force frame per scan. The capacitive touch sensor 110 (e.g., a mutual projected capacitance touch sensor or a self-capacitance touch sensor) can similarly define a standalone or discrete capacitive touch sensor 110 that includes a flexible substrate, sense electrode 116 and capacitance drive electrodes 118 patterned across the flexible substrate, a cover layer (separate from or physically coextensive with the touch sensor surface) over the sense 116 and drive capacitance electrodes 118, and an integrated capacitance controller (hereinafter "capacitive touch sensor sub-controller") that outputs one capacitive image per scan. The capacitive touch sensor 110 can thus be arranged over the pressure sensor 120 and can include a substrate 130 of material configured to flex or deform under minimal applied load. For example, the capacitive touch sensor substrate 130 can include a flexible PCB, whereas the pressure sensor substrate 130 can include a rigid fiberglass or carbon fiber PCB or a PCB with a rigid metal or composite backing, and the flexible PCB of the capacitive touch sensor 110 can be adhered to or otherwise bonded over the resistive layer 125 of the pressure sensor 120. Furthermore, the system 100 can include a display. The capacitive touch sensor 110 can be arranged over the display 190 and the pressure sensor 120 can be arranged under the display 190 opposite the capacitive touch sensor 110. The capacitive touch sensor 110 and the resistive pressure sensor 120 can both span a width and a height of the display. Alternatively, the resistive layer 125 of the pressure sensor 120 and the substrate 130 of the capacitive touch sensor 110 can be physically coextensive. For example, sense and drive electrodes of the capacitive touch sensor 110 can be printed or otherwise applied directly onto the resistive layer 125 of the pressure sensor 120.

In this variation, the pressure and capacitive touch sensors can share a common power source (e.g., a battery) but can otherwise be substantially electrically isolated. For example, the pressure and capacitive touch sensors can be manufactured separately, such as by different manufacturers such that the pressure and capacitive touch sensors exhibit dissimilar implementations, bugs, and/or failure modes that may arise during manufacture. Alternatively, the touch and capacitive touch sensors 110 can each include its own power supply. The pressure and capacitive touch sensors can also include separate and dedicated sub-controllers executing unique firmware in order to avoid similar failure modes at both the pressure and capacitive touch sensors. Furthermore, because the pressure and capacitive touch sensors detect inputs on the touch sensor surface 150 in different ways (using different physics), the pressure and capacitive touch sensors can each exhibit different noise modes, and the system 100 can detect and reject noise in one sensor by comparing its outputs with outputs of the other sensor.

In this variation, the pressure and capacitive touch sensors can also be unsynchronized. In particular, the pressure and capacitive touch sensors can operate at different scan rates. For example, the pressure sensor 120 can operate at a scan rate of 300 Hz and can output 300 force touch images per second, wherein each force touch image specifies the position and force magnitude of each input on the touch sensor surface 150 detected by the pressure sensor 120 during a corresponding scan. In this example, the capacitive touch sensor 110 can operate at a scan rate of 5000 Hz and can similarly output 5000 capacitive touch images per second, wherein each capacitive touch image specifies the position of each input on the touch sensor surface 150 detected by the capacitive touch sensor 110 during a corresponding scan. In another example: the pressure sensor 120 can operate at a scan rate of 1000 Hz and can output 1000 force touch images per second; the capacitive touch sensor 110 can operate at a scan rate of 500 Hz and can output 500 capacitive touch images per second; and the master controller 140 can implement accuracy optimization techniques to compare force and capacitive touch images in response to receipt of a next capacitive touch image or can implement latency optimization techniques to generate virtual capacitive touch images, as described below. However, the pressure and capacitive touch sensors can operate at any other frequency or scan rate.

In this variation, the pressure sensor 120, pressure sensor sub-controller 144, capacitive touch sensor 110, and capacitive touch sensor sub-controller 142 can be integrated into a single device, such as trackpad or mouse. The master controller 140 can also be integrated into this single device and can communicate directly with the force and capacitive touch sensor sub-controllers. For example, the master controller 140 can be connected to the force and capacitive touch sensor sub-controllers 142 via opto-isolators through which sensor data is communicated optically from the pressure and capacitive touch sensor sub-controllers to the master controller. In this example, each of the pressure sensor sub-controller 144, the capacitive touch sensor sub-controller 142, and the master controller 140 can operate within its own power domain, and the pressure and capacitive touch sensor sub-controllers can communicate with the master controller 140 without a direct electrical connection, thereby electrically isolating the sub- and master controllers to damage to the entire system in the event of an electrical surge or short within either of the force or capacitive touch sensors. Alternatively, each of the pressure and capacitive touch sensor sub-controllers can be connected to separate computers, and the separate computers can be networked to a central computer that functions as the master controller 140 to combine and compare data from the pressure and capacitive touch sensors, as described below. In this implementation, the system 100 can thus continue to operate even if one of the two separate computers fails entirely, and the system 100 can exhibit less potential for complete failure given a short or other fault at either of the force or capacitive touch sensors 110 due to electrical isolation of the pressure sensor 120, capacitive touch sensor 110, and master controller.

4.3 Pressure Sensor+Capacitive Touch Sensor+Optical Sensor

As shown in FIG. 2, one variation of the system 100 further includes an optical touch sensor arranged about the perimeter of the force and capacitive touch sensors 110 and configured to detect an object in contact with the touch sensor surface 150. The optical sensor 160 can define a frame encompassing the perimeter of the touch sensor surface 150, can include a set of optical emitters spaced about the frame and configured to project light across the touch sensor surface 150, can include a set of optical detectors 162 configured to detect light output by the optical emitters 164, and can include an integrated optical controller (hereinafter "optical sensor 160 sub-controller") configured to transform magnitudes of light detected by the detectors into the presence and location of one or more objects near or in contact with the touch sensor surface 150. In particular, like the pressure and capacitive touch sensors, the optical sensor 160 can output one optical touch image—containing the position of one or more objects approaching or in contact with the touch sensor surface 150—per scan.

In this variation, the optical sensor 160 can detect an object near (e.g., within two millimeters of) and in contact with the touch sensor surface 150 and the object's location based on changes in incident light detected by the optical detectors, the capacitive touch sensor 110 can detect the location of an electrically-conductive object near and in contact with the touch sensor surface 150 based on changes in the measured capacitance between sense and drive electrodes and the pressure sensor 120 can detect the location of an object in contact with the touch sensor surface 150 and the magnitude of a force with which the object is driven onto the touch sensor surface 150 based on electrical resistance between drive and sense electrodes 126, 128 in the pressure sensor 120. The optical, capacitive, and pressure sensors can therefore implement different sensing modalities and can each exhibit different noise modes. By comparing outputs of the optical, capacitive, and pressure sensors, the master controller 140 can implement redundancy checks to confirm an input detected by one sensor with input data collected by one or both other sensors. Furthermore, the master controller 140 can identify an object approaching the touch sensor surface 150 based on an optical touch image output by the optical sensor, determine that the object has contacted the touch sensor surface 150 based on a capacitive touch image output by the capacitive touch sensor 110, and determine the intent (e.g., location and force magnitude) of the object in contact with the touch sensor surface 150 based on a force touch image output by the pressure sensor 120.

As described above, the optical, capacitive, and pressure sensors can be manufactured separately, such as by different manufacturers such that the optical, capacitive, and pressure sensors may exhibit dissimilar implementations, bugs, and/or failure modes that may arise during manufacture. The optical, capacitive, and pressure sensors can also include separate and dedicated sub-controllers executing unique firmware in order to avoid similar failure modes at the optical, capacitive, and pressure sensors, as described above. Furthermore, the optical, capacitive, and pressure sensors can include separate power supplies, as described above.

4.4 Multiple Pressure Sensors

One variation of the system 100 includes multiple pressure sensors that each output discrete force touch images, and the master controller 140 implements methods and techniques described above to detect and confirm inputs on the touch sensor surface 150 based on a comparison of two (or more) such force touch images recorded at the same or substantially similar times. For example, the system 100 can include two discrete force touch images phased at 0°, each pressure sensor 120 operating 300 Hz (i.e., each outputting 300 force touch images per second), and the master controller 140 can compare force touch images with identical or substantially similar timestamps to detect and confirm one or more inputs on the touch sensor surface 150.

4.4.1 Multiple Discrete Pressure Sensors

Figure 3:
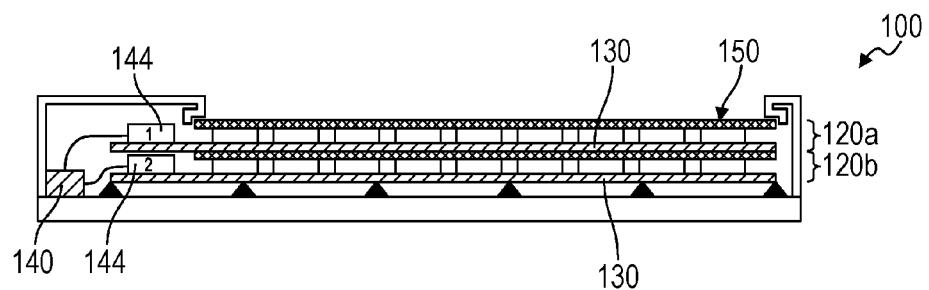
FIG. 3 is a schematic representation of one variation of the system.

As shown in FIG. 3, one implementation of the system 100 includes two discrete pressure sensors, including an upper pressure sensor 120A arranged over a lower pressure sensor 120B. In this implementation, each of the first and second pressure sensors can include: a substrate; an array of sense electrode 126 and drive electrode 128 pairs patterned across the substrate; a resistive layer 125 arranged over the sense electrode 126 and drive electrode 128 pairs and comprising a material exhibiting variations in local bulk and/or local contact resistance responsive to variations in applied force; and an integrated pressure sensor controller 144 configured to read resistance values across each drive and sense electrode pair, to transform these resistance values into both the position and the magnitude of one or more discrete force inputs applied across a surface above the resistive layer, and to output one force touch image containing such position and force magnitude data for each input detected during a single scan of the sense and drive electrodes.

In this implementation, the upper and lower pressure sensors can be substantially identical, each substrate 130 can be of a flexible material (e.g., include a flexible PCB), and the lower substrate can be mounted over a rigid structure, such as a carbon fiber, fiberglass, or metal platform. Alternatively, the upper pressure sensor 120A can include a flexible substrate, and the lower pressure sensor 120B can include a rigid substrate. The substrate of the upper pressure sensor 120A can also be physically coextensive with the resistive layer of the lower pressure sensor 120B, and the sense and drive electrodes of the upper pressure sensor 120A can be patterned across the resistive layer of the lower pressure sensor 120B. When an object contacts the touch sensor surface 150, the substrate 130 of the upper pressure sensor 120A can thus deflect toward the lower pressure sensor 120B such that both the upper and lower pressure sensors can detect the presence and applied force of the object.

In this implementation, the upper and lower pressure sensors can be angularly offset. Generally, if a channel (e.g., a trace connecting multiple drive or sense electrodes) within either pressure sensor is damaged, such as if the touch sensor surface 150 is punctured, all or a portion of electrodes in a damaged channel may become inoperable (i.e., "insensible"). For example, once a channel is damaged, a section of the channel—extending from the damaged region to an end of the channel opposite the pressure sensor sub-controller 144—may no longer be sensible because this section of the channel is no longer electrically coupled to the pressure sensor sub-controller. Furthermore, if two discrete pressure sensors are stacked in an assembly with the drive channels in the upper pressure sensor 120A running substantially parallel to drive channels in the lower pressure sensor 120B, damage to the system 100, such as in the form of a puncture through the touch sensor surface 150, may extend through the upper pressure sensor 120A to the lower pressure sensor 120B such that overlapping sections of both the upper and lower pressure sensors become inoperable. Thus, a puncture or other damage to a system in such a configuration may render a region of the system 100 extending beyond the damage inoperable despite incorporation of multiple discrete pressure sensors within the system 100.

Therefore, in this implementation, the upper pressure sensor 120A can be installed over, mounted to, or fabricated on the lower pressure sensor 120B at an angle. In particular, channels of the upper pressure sensor 120A can be angularly offset from channels of the lower pressure sensor 120B such that, when an object punctures the upper and lower pressure sensors, a section of a first channel in the upper pressure sensor 120A that became inoperable as a result of such damage is not arranged directly over (i.e., does not coincide with) a section of a second channel in the lower pressure sensor 120B that also became inoperable as a result of this damage. For example, column channels in the upper pressure sensor 120A can form a 15°, 30° or 45° angle with column channels in the lower pressure sensor 120B. In this example, the upper pressure sensor 120A can define a rectangular sensor area with channels running parallel to edges of the rectangular sensor area, and the lower pressure sensor 120B can define a similar rectangular sensor area with channels running at angles to the edges of the rectangular sensor area, or vice versa. Therefore, by incorporating multiple pressure sensors that are angularly offset, the system 100 can leverage the multiple pressure sensors to preserve sensibility of nearly a full area of the sensor area—except at a local region that is mechanically damaged—despite a puncture through all pressure sensors in the assembly. In particular, once damage to an upper pressure sensor 120A and the location of such damage in the upper pressure sensor 120A is detected by the master controller, the master controller 140 can identify inoperable regions in the upper pressure sensor 120A, discard sensor data for these inoperable regions and collected from the upper pressure sensor 120A, and implement only sensor data collected from the lower pressure sensor 120B and coincident these inoperable regions for inputs on the touch sensor surface 150 over the inoperable regions of the upper pressure sensor; and vice versa. For coinciding regions of the upper and lower pressure sensors that remain operable, the master controller 140 can detect and confirm inputs on the touch sensor surface 150 based on input data from both the upper and lower pressure sensors, such as described above.

In this implementation, the system 100 can include additional pressure sensors. For example, the system 100 can include four discrete pressure sensors arranged in a stack and angularly offset with their column channels arranged at 0°, 15°, 30°, and 45° relative angular orientations, and the master controller 140 can implement methods and techniques described above to detect and confirm an input on the touch sensor surface 150 based on four discrete force touch images received from the four touch sensors during a single scan. In this example, when comparing force touch images to detect and confirm an input, the system 100 can also apply greater weight to a lowest pressure sensor in the stack since the lowest pressure sensor 120 may be least likely to suffer from mechanical damage; the system 100 can similarly apply a lowest weight to a highest pressure in the stack since the highest pressure sensor may be most likely to suffer from mechanical damage, such as by a puncture. Furthermore, in this implementation, each discrete pressure sensor sub-controller 144 account for the angular position of its corresponding channels, such as by projecting an original "skewed" force touch image on a rectangular force touch image representing a square grid array of sensor and drive electrodes patterned across a rectangular input area. Alternatively, the master controller 140 can accommodate for the angular position of each pressure sensor when comparing and matching possible inputs detected by the two or more pressure sensors 120.

4.4.2 Multiple Pressure Sensors on Double-Sided Common Substrate

Figure 4:
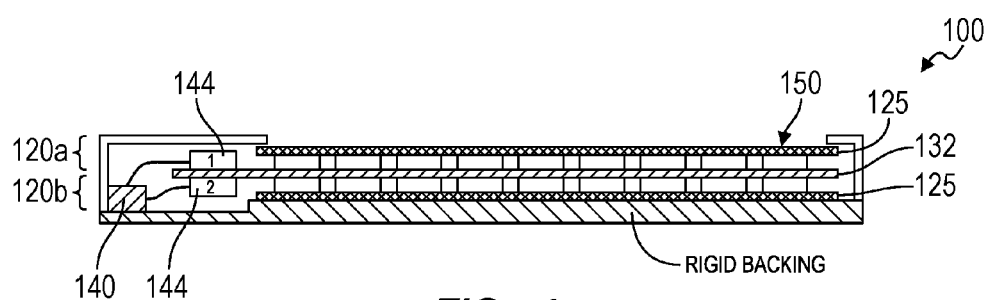
FIG. 4 is a schematic representation of one variation of the system.

As shown in FIG. 4, another implementation of the system 100 includes: one substrate; and one integrated pressure sensor controller 144, one set of ground and sensor electrodes, and one force-sensitive layer on each side of the substrate. In this implementation, the substrate 130 can define a planar structure (e.g., a flat, flexible PCB) including two planar sides. The drive and sense electrodes of an upper pressure sensor 120A can be patterned across the upper side of substrate; the integrated pressure sensor controller 144 of the upper pressure sensor 120A can be installed on the upper side of the substrate 130 adjacent the drive and sense electrodes of the upper pressure sensor; and a resistive layer 125 of the upper pressure sensor 120A can be arranged over the upper side of the substrate 130 to complete the upper pressure sensor 120A. Similarly, the drive and sense electrodes of a lower pressure sensor 120B can be patterned across the lower side of substrate; the integrated pressure sensor controller 144 of the lower pressure sensor 120B can be installed on the lower side of the substrate 130 adjacent the drive and sense electrodes of the lower pressure sensor; and a resistive layer 125 of the lower pressure sensor 120B can be arranged over the lower side of the substrate 130 to complete the lower pressure sensor 120B. The resistive layer 125 of the lower pressure sensor 120B can be backed by a rigid structure, such as a fiberglass or metal structure, as described above, and the resistive layer 125 of the upper pressure sensor 120A can define the touch sensor surface 150. The system 100 can thus include multiple pressure sensors sharing a common substrate 132 but outputting discrete force touch images per scan.

4.4.3 Multiple Pressure Sensors on Single-Sided Common Substrate

Figure 5:
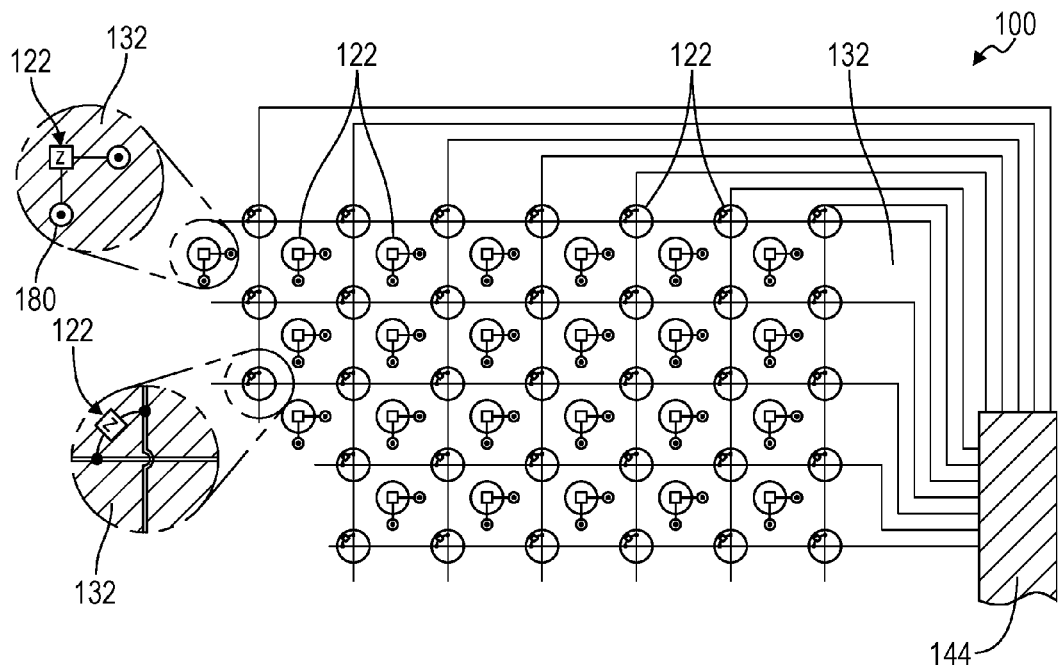
FIG. 5 is a schematic representation of one variation of the system.
Figure 6:
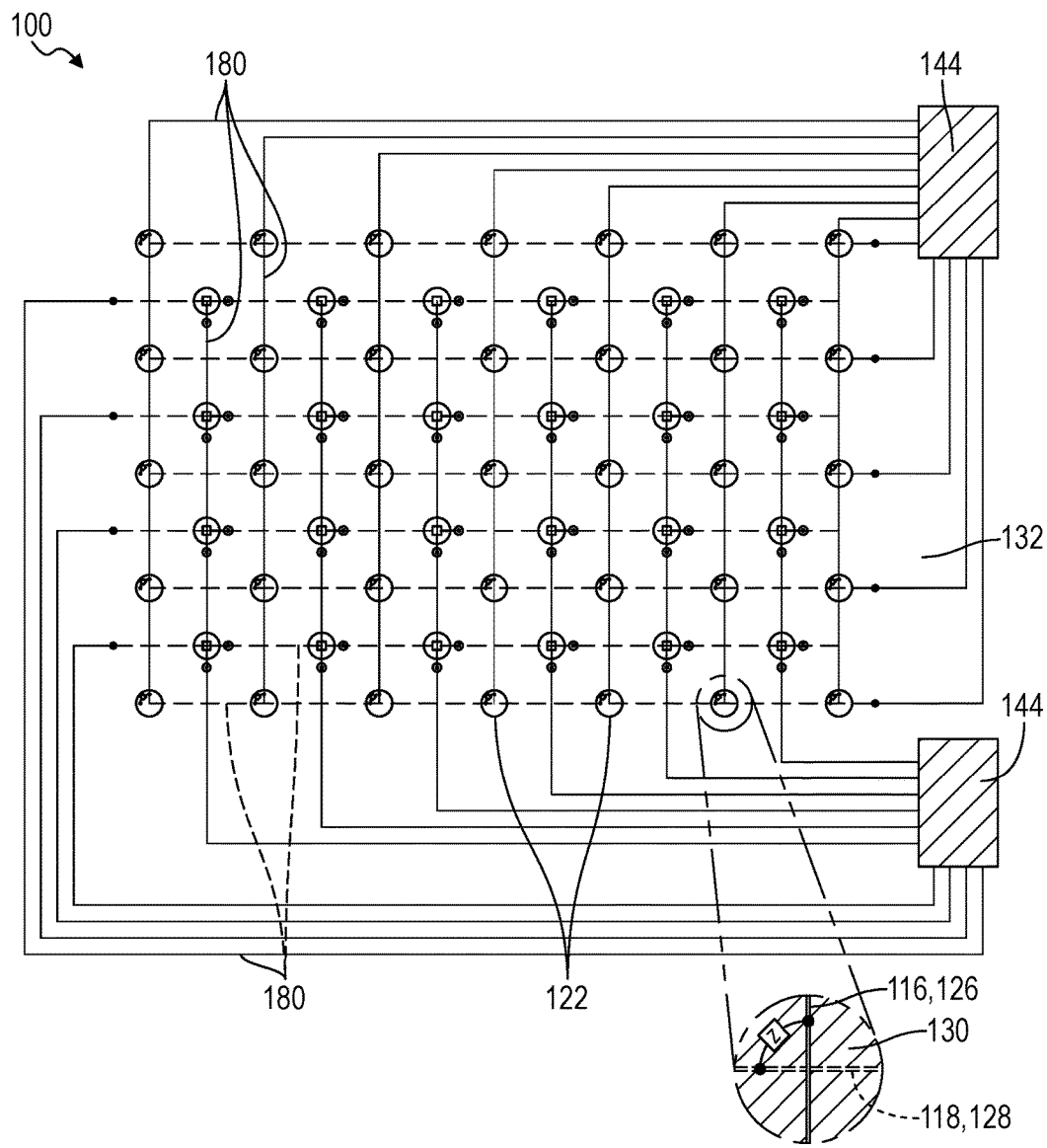
FIG. 6 is a schematic representation of one variation of the system.

As shown in FIGS. 5 and 6, yet another implementation of the system 100 includes two discrete pressure sensors with their corresponding drive and sense electrodes patterned across a common side of a shared substrate. In this implementation, each pressure sensor 120 can include multiple sense pixels, wherein each sense pixel 122 includes two drive electrodes 128 and two sense electrodes 126. Sense pixels 122 in a first pressure sensor 120A can be patterned across a first side of the substrate 130 in a square grid array; the integrated pressure sensor controller 144 of the first pressure sensor 120A can be arranged on the first side of the substrate 130 and can be connected to the drive and sense electrodes of the first pressure sensor 120A via traces running along the first side of the substrate. Furthermore, sense pixels 122 in a second pressure sensor 120B can be arranged within interstices between four adjacent sense pixels 122 in the first pressure sensor; the integrated pressure sensor controller 144 of the second pressure sensor 120B can be arranged on the second side of the substrate 130 and can be connected to traces running along the second side of the substrate 130 and connected to the drive and sense electrodes of the second pressure sensor 120B by vias 180 passing from the second side of the substrate to the first side of the substrate. (Alternatively, the integrated pressure sensor controller 144 of the second pressure sensor 120B can be arranged on the first side of the substrate 130 and connected to the drive and sense electrodes of the second pressure sensor 120B via traces and vias 180 on one or more other layers of the substrate.) The first and second pressure sensor can thus include sense pixels 122 in a square close-pack array.

As shown in FIG. 6, sense electrodes 116 of both the first and second pressure sensors can be arranged in columns on a first side of the substrate, and drive electrodes 118 of both the first and second pressure sensors can be arranged in rows on the opposite side of the substrate 130 (or vice versa) and can meet corresponding drive electrodes 118 on the first side of the substrate 130 by vias 180 passing through the substrate. In this implementation, the system 100 can include a single resistive layer over the substrate 130 such that the first and second pressure sensors share both a common substrate 132 and a common resistive layer. The integrated pressure sensor controllers 144 of the first and second pressure sensors can thus each output one discrete force touch image per scan, and the master controller 140 can merge these force touch images into detection and confirmation of one or more inputs on the touch sensor surface 150, such as according to methods and techniques described above.

5. Input Comparisons

The master controller 140 can therefore compare outputs of the force and capacitive touch sensors 110 to confirm or refute a possible input on the touch sensor surface 150 detected by the pressure and capacitive touch sensors. In one implementation, if a first input detected by the pressure sensor 120 is matched to a second input detected by the capacitive touch sensor 110 and if the first input (or centroid of the first input) occurs within a threshold distance of the second input (or centroid of the second input), the master controller 140 can confirm the presence and location of the first input within a composite touch image. (The master controller 140 can also average or otherwise combine the positions of the first and second inputs and store this composite position as the location of the first input in the composite touch image.) However, if the capacitive touch sensor 110 outputs a capacitive touch image indicating a possible input at a particular location but the force touch image output by the pressure sensor 120 at the corresponding time excludes a possible input at or near the particular location (e.g., if the master controller 140 fails to determine a force input match for the capacitive input), the master controller 140 can characterize the possible input detected by the capacitive touch sensor 110 as noise and can automatically remove this noise from subsequent capacitive touch images output by the capacitive touch sensor 110. Alternatively, the master controller 140 can characterize the possible input detected by the capacitive touch sensor 110 as a very light touch that failed to exceed a threshold force detectable by the pressure sensor 120.

In the foregoing implementation, if the pressure sensor 120 outputs a force touch image that indicates a possible input at a particular location but the corresponding capacitive touch image output by the capacitive touch sensor 110 does not indicate a possible input at or near the same location, the master controller 140 can determine that at least one of the force and capacitive touch sensors 110 to be faulty and disable the system 100. Alternatively, the master controller 140 can characterize an input object in contact with the touch sensor surface 150 and detected by the pressure sensor 120 as substantially non-conductive (and therefore not substantially detectable by the capacitive touch sensor). Yet alternatively, the master controller 140 can assign greater values to force touch images output by the pressure sensor 120 than to capacitive touch images output by the capacitive touch sensor 110, such as if the pressure sensor 120 exhibits greater mechanical and/or electrical reliability than the capacitive touch sensor 110, and the master controller 140 can reject a possible input or lack of possible input at a particular location indicated in the capacitive touch image output by the less-robust capacitive touch sensor 110. The master controller 140 can also predict the capacitive touch sensor 110 to be faulty if the capacitive touch image output by the capacitive touch sensor 110 does not match the force touch image output by the pressure sensor 120.

The master controller 140 can also compare force and capacitive touch images output by the force and capacitive touch sensors 110 across a sequence of consecutive scans to confirm a possible input on the touch sensor surface 150. For example: if the system 100 matches a possible input between force and capacitive touch images output by the force and capacitive touch sensors 110 during a single scan, the master controller 140 can confirm the possible input and output of a composite touch image accordingly. However, if the force and capacitive touch image sensor outputs do not match, the master controller 140 can: delay output of the composite touch image (or output an "unknown input" command" or a "pause" command); compare force and capacitive touch images output during a preceding scan to the force and capacitive touch images output during the current scan. In this example, if three of the four force and capacitive touch images match (i.e., indicate possible inputs on the touch sensor surface 150 at locations within a threshold distance of one another), the master controller 140 can confirm a touch input at an average of these three locations and label the fourth unmatched sensor output value as noise (or flag the force or capacitive touch sensor 110 that output the fourth unmatched sensor output value as faulty). In this example, if both capacitive touch images from the two consecutive scans match (i.e., indicate inputs at approximately identical locations on the touch sensor surface) and both force touch images from the two consecutive scans match, the master controller 140 can confirm an input detected by the pressure sensor 120 (e.g., if outputs of the pressure sensor 120 are weighted greater than outputs of the capacitive touch sensor); disable the system 100 due to one or both of the force and capacitive touch sensors 110 being faulty; or handle these differing values in the force and capacitive touch images in any other way. The master controller 140 can implement similar methods and techniques to confirm or refute inputs on the touch sensor surface 150 based on force and capacitive touch images collected during a greater number of (e.g., ten) consecutive scans.

5.1 Multi-Touch

To match inputs represented in a force touch image to inputs represented in a capacitive touch image, the master controller 140 can compare the position of an input in the force touch image to the position of each input represented in the capacitive touch image. In particular, the master controller 140 can: calculate a score representing the proximity of the position of the input in the force touch image to the position of an input in the capacitive touch image for each input represented in the capacitive touch image; then repeat these processes for each input represented in the force touch image; and populate a score matrix with these scores. For a first input in the force touch image and a first input in the capacitive touch image for which a greatest score exceeding a preset score threshold (or a lowest error less than a preset error threshold) was calculated, the master controller 140 can match these first inputs in the force and capacitive touch images and remove the first inputs from a list of unmatched inputs. For a second input in the force touch image and a second input in the capacitive touch image for which a next greatest score exceeds the preset score threshold (or for which a next lowest error is less than the preset error threshold), the master controller 140 can then match these second inputs in the force and capacitive touch images and remove the second inputs from the list of unmatched inputs. The master controller 140 can repeat this process until all touch inputs in either the force or capacitive touch image have been matched to one input in the other touch image.

The master controller 140 can then discard remaining (unconfirmed) inputs represented in the force or capacitive touch image. Alternatively, the master controller 140 can label or characterize these remaining inputs represented in the force or capacitive touch image as noise or determine that the pressure or capacitive touch sensor 110 that outputs a touch image containing these unconfirmed inputs is faulty or damaged.

In addition to relative position, the master controller 140 can also calculate a score between an input represented in a force touch image and an input represented in a capacitive touch image based on size (e.g., area) or shape of each input area represented in the force and capacitive touch images. The master controller 140 can additionally or alternatively calculate a score between an input represented in a force touch image and an input represented in a capacitive touch image based on trajectories (e.g., directions, velocities) of these inputs calculated or interpolated from comparisons with preceding force and capacitive touch images. However, the master controller 140 can calculate a score (or an error) between an input represented in a force touch image and an input represented in a capacitive touch image—captured at substantially similar times—based on any other one or more parameters. The master controller 140 can implement similar methods or techniques: to score inputs represented in an original capacitive touch image with inputs represented in a virtual force touch image (described above) generated for a corresponding time; to score inputs represented in an original force touch image with inputs represented in a composite capacitive touch image (described above) generated from multiple capacitive touch images recorded since a last force touch image was recorded; and/or to match inputs across a sequence of capacitive touch images; etc.

5.2 Contextual Comparison

In this variation, the master controller 140 can implement contextual comparison methods to selectively compare optical, capacitive, and force touch images based on a state of the system 100. In one implementation, if none of the optical, capacitive, and pressure sensors detect an object on (or near) the touch sensor surface 150—such as if none of the last three touch images output by the optical, capacitive, and pressure sensors indicate a possible input—the master controller 140 can disable the pressure sensor 120 or disable analysis of subsequent force touch images and instead analyze optical and capacitive touch images to detect and confirm an object approaching the touch sensor surface 150. In particular, the optical sensor 160 can detect objects approaching but not yet in contact with the touch sensor surface 150 based on changes in light intensity detected by its internal optical detectors, and the capacitive touch sensor 110 can similarly detect objects approaching but not yet in contact with the touch sensor surface 150 based on local changes in capacitance across its internal drive and sense electrodes. In this implementation, upon receipt of optical and capacitive touch images, the master controller 140 can implement methods and techniques described above to compare possible inputs or deviations represented in the optical and capacitive touch images and to confirm or refute a possible upcoming input in the form of an approaching object. Once an approaching object is thus detected, the master controller 140 can activate the pressure sensor 120 and/or compare force touch images output by the pressure sensor 120 with optical and capacitive touch images output by the optical and capacitive touch sensors, such as according to methods and techniques described above, in order to detect and confirm contact between the object and touch sensor surface 150. Once contact between the object and the touch sensor surface 150 is confirmed, the master controller 140 can disable the optical sensor 160 or disable analysis of subsequent optical touch images and instead analyze force and capacitive touch images to detect and confirm application of a force on the touch sensor surface 150 (i.e., an "input"), such as according to methods and techniques described above.

In another implementation, the system 100 can compare only force and capacitive touch images until a possible input represented in one force or capacitive touch image is not matched to a possible input in the other touch image. In this implementation, the master controller 140 can write optical touch images to a buffer throughout operation but may only compare optical touch images to force and capacitive touch images when a possible input is represented in one of the force and capacitive touch images but not in the other force or capacitive touch image. The master controller 140 can thus access data from a third sensor to tiebreak differences between force and capacitive touch images.

In one example of the foregoing implementation, the system 100 can rely on a combination of optical, pressure, and capacitive touch sensors 110 to confirm inputs into the system 100. The optical sensor 160 and the capacitive touch sensor 110 can function to confirm an approach (or proximity) of an input toward a touch sensor surface; the optical sensor 160, the capacitive touch sensor 110, and the pressure sensor 120 can cooperate to define and confirm a location of an input; and the pressure sensor 120 can function to define a magnitude (i.e., a force or pressure magnitude) of the input on the touch sensor surface 150.

The system 100 can implement the foregoing methods and techniques to maintain performance (e.g., redundancy, output precision) while reducing power consumption by eliminating operation of a second redundant sensor and processing of sensor from the second redundant sensor. However, the system 100 can implement any other methods or techniques to detect inputs on the touch sensor surface 150 based on optical, capacitive, and force touch images output by one or more optical, capacitive, and pressure sensors.

6. Scanning and Latency

In one implementation in which the capacitive touch sensor 110 operates at a scan rate greater than a scan rate of the pressure sensor 120, the system 100 writes capacitive touch images output by the capacitive touch sensor 110 to a buffer while waiting for a next force touch image from the pressure sensor 120. Upon receipt of a next force touch image from the pressure sensor 120, the master controller 140 can: select a region of interest (e.g., a region indicating at least one input) in the force touch image; map the region of interest in the force touch image to capacitive touch images in the buffer; calculate an average position of inputs in the region of interest in the capacitive touch images; and calculate a capacitive touch confidence score based on a proportion of inputs in the region of interest in the capacitive touch images. The master controller 140 can then: confirm the presence and location of an input on the touch sensor surface 150 based on alignment between the position of the input in the region of interest in the force touch image and the average position of the input in the capacitive touch images if the capacitive touch confidence exceeds a threshold confidence value; discard a possible input on the touch sensor surface 150 due to lack of conformity between the position of the input in the force touch image and the average position of an input in the capacitive touch images; and then clear the buffer in preparation for a next sequence of capacitive touch images and a next force touch image.

In this implementation, the master controller 140 can also separately analyze capacitive touch images stored in the buffer, such as before or in response to receipt of a next force touch image from the pressure sensor 120. For example, the master controller 140 can: match an input across multiple capacitive touch images stored in the buffer; detect anomalies in changes in positions of this input, such as rapid trajectory changes (e.g., a large trajectory deviation in a small timeframe), across these capacitive touch images; and discard anomalous capacitive touch images from the buffer in preparation for subsequent comparison of touch images in the buffer with the latest force image. The master controller 140 can repeat these methods and techniques for each touch input—on the touch sensor surface 150—indicated in the force and touch images.

In this implementation, the master controller 140 can thus merge capacitive touch images and a single force touch image into a composite image representing locations (and forces) of confirmed inputs on the touch sensor surface 150 for a scan cycle including multiple touch sensor scans followed by a single pressure sensor scan.

6.1 Latency Optimization

In another implementation, upon receipt of a current capacitive touch image from the capacitive touch sensor 110 (operating at a faster scan rate than the pressure sensor) at a current time, the master controller 140 can generate a virtual force touch image for the current time by extrapolating (e.g., linearly extrapolating) the position and force magnitude of an input on the touch sensor surface 150 from a last pressure sensor scan and one or more preceding pressure sensor scans. The master controller 140 can then implement methods and techniques described above to: select a region of interest in the virtual force touch image; map the region of interest in the virtual force touch image to the current capacitive touch image; confirm the presence and location of an input on the touch sensor surface 150 based on alignment between the position of the input in the virtual force touch image and the position of the input in the capacitive touch image; and discard a possible input on the touch sensor surface 150 due to lack of conformity between the position of an input in the virtual force touch image and the position of an input in the capacitive touch image.

In this implementation, the master controller 140 can thus generate a virtual force touch from one or more past force touch images, compare this virtual force touch image to a capacitive touch image to detect and confirm an input on the touch sensor surface 150, and output a composite image representing the location (and force) of each confirmed input on the touch sensor surface 150 for a current scan cycle representing a single capacitive touch sensor scan.

In this implementation, the master controller 140 can also calculate a contact velocity and a contact acceleration based on multiple past (real) force touch images, compare these contact velocity and contact acceleration values to preset maximum velocities and accelerations for which a human is capable, and reject a possible input represented in the current (real or virtual) force touch image if either of the calculated contact velocity and contact acceleration values exceed these preset maximum velocities and accelerations. The master controller 140 can implement similar methods and techniques to check possible inputs represented in capacitive touch images collected over time during operation of the system 100.

6.2 Sampling Rates

In one implementation, sensors in the system 100 can be sampled at different scan rates. In this implementation, the system 100 can read a sequence of capacitance value images from the capacitive touch sensor 110 at a first scan rate (e.g., 125 Hz), wherein each capacitance value image includes capacitance values at each capacitive sense electrode 116 pair (e.g., sense and drive electrode pair) in the capacitive touch sensor 110 during a corresponding scan period. The system 100 can also read the first pressure value by reading a sequence of pressure value images from the pressure sensor 120 at a second scan rate (e.g., 250 Hz) greater than the first scan rate. In this implementation, each pressure value image can include resistance values at resistive sense electrode 126 pairs (e.g., sense and drive electrode pairs) in the pressure touch sensor during a corresponding scan period. The system 100 can then detect presence of the first input on the touch sensor surface 150 at the first location at the first time by: extrapolating a first capacitance value image—aligned to the first time—from a set of capacitance value images preceding the first time; and mapping the first capacitance gradient to the first capacitance value image to generate a first capacitance touch image representing locations of disturbances in capacitance greater than capacitance thresholds assigned to regions across the capacitive touch sensor 110 by the first capacitance gradient. To detect presence of the second input on the touch sensor surface 150 proximal the first location at approximately the first time, the system 100 can: map the first pressure gradient to a first pressure value image—recorded at approximately the first time—to generate a first pressure touch image representing locations and magnitudes of disturbances in applied pressures greater than pressure thresholds (e.g., deviating from baseline resistance values for the first time by more than corresponding pressure thresholds) assigned to regions across the pressure sensor 120 by the first pressure gradient; and then merge the first input and the second input into a confirmed touch input by calculating a linear combination (e.g., a weighted average) of the first capacitance touch image and the first pressure touch image, which is geometrically aligned to the first capacitance touch image. Additionally, the system 100 can generate the first touch image from the linear combination of the first capacitance touch image and the first pressure touch image.

In the foregoing implementation, the system 100 interpolates between capacitance values—sampled at a scan rate slower than the scan rate of the pressure sensor 120—in order to align, in time, the capacitance scans performed by the capacitive touch sensor 110 with the pressure scans performed by the pressure sensor 120. Thus, the system 100 can "up-sample" capacitance values read by the capacitive touch sensor 110. Alternatively, the system 100 can "down-sample" pressure values from the pressure sensor 120 to align pressure scans in time with capacitive scans performed by the capacitive touch sensor.

Furthermore, the master controller 140 of the system 100 can implement accuracy optimization or latency optimization methods and techniques described above to confirm or refute possible inputs detected by the optical, capacitive, and pressure sensors. For example, each of the optical, capacitive, and pressure sensors can operate at different scan rates (e.g., 1000 Hz, 5000 Hz, and 300 Hz respectively). In this example, the master controller 140 can store optical and capacitive touch images between receipt of force touch images and then, in response to receipt of a next force touch image: discard anomalous optical and capacitive touch images; average or compile like inputs represented across the consecutive sequence of optical touch images; average or compile like inputs represented across the consecutive sequence of capacitive touch images; implement multi-touch matching techniques to score and match composite inputs represented in the optical, capacitive, and force touch images; confirm inputs matched across all three touch images; and discard (or characterize as noise) unmatched inputs (i.e., inputs represented in only three of the touch images). Alternatively, the control can generate virtual optical and force touch images, as described above, and compare possible inputs represented in these virtual, optical, and force touch images to original capacitive touch images to confirm or discard possible inputs detected on the touch sensor surface 150.

7. Threshold Gradients and Weights

In one implementation shown in FIGS. 8 and 10, Block S110 defines a first capacitance gradient of capacitance thresholds spanning a sense array of a capacitive touch sensor; and Block S120 defines a first pressure gradient of pressure thresholds spanning a sense array of a pressure sensor 120 coupled to the capacitive touch sensor 110. Generally, in Blocks S110 and S120, the system 100 calibrates each sense electrode in the sense array, establishes baseline sensitivity thresholds (i.e., capacitance thresholds and pressure thresholds) for each sense electrode in the sense array, and forms a gradient map of the baseline sensitivity thresholds across the entire sense array of each type of sensor (i.e., capacitance gradient and a pressure gradient). By defining a capacitance gradient of capacitance thresholds in Block S110, the system 100 can locally calibrate each capacitive sense electrode in the capacitive touch sensor 110 to detect inputs exceeding the capacitance thresholds defined by the capacitance gradient. Likewise in Block S120, the system 100 can locally calibrate each resistive sense electrode 126 in the pressure sensor 120 to detect inputs exceeding the pressure thresholds defined by the pressure gradient.

In one implementation, Blocks S110 and S120 can generally function to dynamically calibrate (and re-calibrate) sense electrodes 116 in the capacitive touch sensor 110 and sense electrodes 126 in the pressure sensor 120 in response to defects in the sense array, adverse environmental conditions for a sensor, and/or poor performance of a sensor in detecting a particular type of input at a particular location in the sense array. In particular, each sense electrode 116 in the capacitive touch sensor 110 sense array can detect inputs in response to a measured capacitance value of the input exceeding a static or dynamic (e.g., "floating") baseline capacitance value by more than a capacitance threshold, thereby "calibrating" the sense electrode 116 and tuning the capacitance threshold to detect certain electrical events representative of intentional inputs and reject other electrical events. For example, a user may hover a finger offset above the touch sensor surface 150 by ~1 cm. If the electric field output by a capacitive sensor electrode in the capacitive touch sensor 110 proximal the finger is disturbed by more than a threshold capacitance value, the capacitive touch sensor 110 can detect the finger hovering over the touch sensor surface 150 as an input to the touch sensor surface 150. In this example, the system 100 can implement Blocks S110 to tune the capacitance threshold of the sense electrode 116 to reduce sensitivity to such disturbances in the electric field generated by the sense electrode 116 in order to reject capacitive events occurring at such distances from (and not directly contacting) the touch sensor surface 150.

In Block S110, capacitive thresholds can be defined for each sense electrode 116 in the sense array of the capacitive touch sensor, such as uniquely or in groups, as shown in FIG. 8, when the system 100 is manufactured, after each scan of the capacitive touch sensor 110, and/or at intervals throughout a life of the system 100. Additionally, capacitance thresholds for each sense electrode 116 in the sense array can be uniform or can differ based on desired capacitive sensitivity for discrete locations across the touch sensor surface 150. Thus, in Block S110, the system 100 defines a capacitive gradient of capacitance thresholds mapped across the entire sense array of the capacitive touch sensor 110. For example, the capacitive gradient may define lower thresholds near an edge of the sense array near an edge of a touchscreen of a mobile phone and higher thresholds near a center of the touchscreen of the device. Lower thresholds near the edge function to detect and locate less precisely located inputs of lower capacitance values near the edge. Higher thresholds near the center function to detect more precisely located and applied inputs exhibiting higher capacitance values near the center (i.e., where the input is surrounded by sense electrodes).

Likewise, in Block S120, the system 100 can define pressure thresholds in a similar manner to the capacitive thresholds described above in Block S110. Generally, sense electrodes 126 in the sense array of the pressure sensor 120 detect pressures exceeding the pressure threshold magnitude. By calibrating the pressure thresholds in Block S120, the system 100 can function to distinguish between incidental events on the touch sensor surface 150 such as gentle resting of a thumb on a touch pad, measured as a low pressure value by the pressure sensor 120, and intentionally applied inputs measured as a high pressure value by the pressure sensor 120. In Block S120, the system 100 can define pressure thresholds for each sense electrode 116 in the sense array of the pressure sensor 120 at a single time, after each scan of the sense array, and/or at intervals throughout a life of the system 100. Additionally, pressure thresholds for each sense electrode 116 in the sense array can be uniform or can differ based on desired pressure sensitivity for each location across a touch sensor surface 150.

In Blocks S110 and S120, the capacitive threshold and the pressure threshold can be defined as a minimum capacitance deviation from a static or floating baseline capacitance value to trigger detection of an input via the capacitive touch sensor 110 and a minimum pressure value deviation from a static or floating baseline pressure value to trigger detection of an input via the pressure sensor, respectively. In particular, the capacitive threshold can be an offset or difference threshold from a baseline capacitance value while the pressure threshold can be a difference threshold from a baseline pressure value. For example, a pressure value exceeding the baseline pressure value by more than the difference threshold can be identified as an input.

The capacitance gradient and pressure gradient recited in Blocks S110 and S120 can be distinct or can be related to one another. For example, the capacitance gradient mapped across the capacitive touch sensor 110 can be inversely proportional to the pressure gradient mapped across the pressure sensor 120 arranged under the capacitive touch sensor 110. In this example, in Block S110, the system 100 can define a lower capacitance threshold proximal a corner of the touch sensor surface 150, a moderate capacitance threshold at an edge of the touch sensor surface 150, and a high capacitance threshold at a center of the touch sensor surface 150. In Block S120, the system 100 can then define a high pressure threshold proximal the corner, a moderate pressure threshold at the edge, and a low pressure threshold proximal the center of the touch sensor surface 150. Thus, the pressure sensor 120 and the capacitive touch sensor 110 can cooperate to reduce resource load required by the system 100 to detect and handle inputs on the touch sensor surface 150 by manipulating thresholds with which the system 100 detects inputs at each sensor.

In another implementation, Block S130 recites, through the capacitive touch sensor 110, reading a first capacitance value from a first capacitive sense electrode 116 in the sense array of the capacitive touch sensor 110 proximal a first location on a touch sensor surface 150 at a first time; and Block S140 recites detecting presence of a first input on the touch sensor surface 150 at the first location at the first time in response to the first capacitance value exceeding a first capacitance threshold assigned to the capacitive touch sensor 110 proximal the first location by the first capacitance gradient. Generally, Blocks S130 and S140 function to read capacitance values from each sense electrode 116 in the sense array of the capacitive touch sensor 110 and determine that these capacitance values exceeding the capacitance threshold—defined by the capacitance gradient in Block S110—constitute an input.

Likewise, Block S150 recites, through the pressure sensor 120, reading a second pressure value from a first resistive sense electrode 126 in the sense array of the pressure sensor 120 proximal the first location on the touch sensor surface 150 at approximately the first time; and In Block S160, the system 100 recites detecting presence of a second input on the touch sensor surface 150 proximal the first location at approximately the first time in response to the second pressure value exceeding a first pressure threshold assigned to the pressure sensor 120 proximal the first location by the first pressure gradient. Generally, Blocks S150 and S160 function to read pressure values from each sense electrode 126 in the sense array of the pressure sensor 120 and determine that the pressure values exceeding the pressure threshold—defined by the pressure gradient in Block S110—constitute an input.

In one example of the foregoing implementation, Blocks of the method S100, can be implemented to detect presence of the first input on the touch sensor surface 150 in response to the first capacitance value differing from a baseline capacitance value, calculated for the first time, by more than the first capacitance threshold; to read a resistance value across the first resistive sense electrode 126 and a first drive electrode 128 in the sense array of the pressure sensor 120 proximal the first location on the touch sensor surface; and to detect presence of the second input on the touch sensor surface 150 in response to the second pressure value differing from a baseline resistance value—calculated for the first time—by more than the first pressure threshold.

In general, by tuning sensor thresholds in Block S110 through Block S160, the system can selectively prioritize inputs detected by discrete sensors (i.e., capacitive, optical, and/or pressure sensors) integrated into the system 100. Thus, as described below, the system 100 can implement Block S110 through Block S160 to compensate for defects in one or more sensors, to compensate for efficacy of each sensor under certain conditions or usage scenarios, etc.

7.1 Weights

As shown in FIGS. 7 and 9, one variation of the method includes: increasing a first weight assigned to inputs detected through the capacitive touch sensor 110 proximal the intermediate location in Block S176; decreasing a second weight assigned to pressures detected by the pressure sensor 120 proximal the intermediate location in Block S178; and confirming a second input proximal the intermediate location based on the second input detected by the capacitive touch sensor 110 weighted according to the first weight and based on a second pressure detected by the pressure sensor 120 proximal the intermediate location weighted according to the second weight in Block S170. Generally, the system 100 can weight and merge inputs detected by the pressure and capacitive touch sensors by calculating a linear combination (e.g., an average) of a capacitive input, weighted according to a first assigned weight, and a pressure input, weighted according to a second assigned weight. Generally, in this variation, inputs detected by the system 100 in Blocks S110, S120, S130, S140, S150, and S160 by the capacitive touch sensor 110 and the pressure sensor 120 can be assigned weights (e.g., "priority factors") dictating how heavily capacitive inputs detected by the capacitive touch sensor 110 and pressure inputs detected by the pressure sensor 120 are prioritized relative to each other when confirming an input on the touch sensor surface, generating a touch image representing the confirmed input, and outputting the touch image to the computing device. The system 100 can implement Blocks S170, S176, and S178 in addition to or as an alternative to implementing sensor threshold gradients, such as the capacitive gradient and the pressure gradient described above.

In particular and as shown in FIG. 9, the system 100 can generate or define a capacitive weight image that represents weights assigned to inputs detected at discrete locations across the capacitive touch sensor 110. For example, a discrepancy between expected pressure values and actual pressure values read from sense electrodes 126 at a particular location in the pressure sensor 120 can indicate a defect in (or malfunction of) the pressure sensor 120 proximal the particular location. In response to detecting this discontinuity in pressure sensor 120 values, the system 100 can locally increase a first weight stored in a first location in the capacitive weight image corresponding to the detected location of this discontinuity.

The system can also generate a pressure weight image that represents weights assigned to pressures detected at discrete locations across the pressure sensor 120. In the foregoing example, in response to detecting the discontinuity in pressure sensor 120 values, the system 100 can locally decrease a second weight stored in a second location in the pressure weight image corresponding to the detected location of this discontinuity. such decrease to the second weight in the pressure weight image can be inversely proportional to the increase in the first weight in order to assign greater priority to capacitance values and reduced priority to pressure values read by these sensors near a location on the touch sensor surface 150 associated with a defect in the pressure sensor 120, as indicated by discontinuities in detected pressures of inputs remaining in contact with the touch sensor surface 150 as they move toward and past the location of the discontinuity (e.g., during entry of swipe- and scroll-type inputs into the system). For example, the system 100 can assign an initial weight of 40% to the first weight for the capacitive touch sensor 110 proximal the first location and an initial weight 60% to the second weight for the pressure sensor 120 proximal the first location in order to accommodate slightly greater efficacy of the pressure sensor 120 in reliably detecting inputs in a broader range of usage scenarios. The system 100 can then increase the first weight to 55% and decrease the second weight to 45% in response to detecting the discontinuity in the pressure sensor 120 proximal the first location. The system 100 can also: locally decrease weights, in the pressure weight image, corresponding to an area of the pressure sensor 120 coincident and encompassing the discontinuity; and locally increase the weights, in the pressure weight image, corresponding to the area of the capacitive touch sensor 110 coincident and encompassing the discontinuity. Then the system 100 can: confirm a second input proximal the first location at a third time by: recording a capacitive touch image representing the second input detected proximal the location coincident the defect at the third time; recording a pressure image representing a second pressure detected proximal the location of the defect at approximately the third time; generating a touch image representing the second input proximal the location of the defect by merging the capacitive touch image and the pressure image according to the capacitive weight image and according to the pressure weight image, respectively; and outputting the touch image to a computing device coupled to the capacitive touch sensor 110 and the pressure sensor 120.

Furthermore, in Blocks S176 and S178, the system 100 can define weight gradients spanning the full width and length of the touch sensor surface. In this implementation, the system 100 can define a first weight gradient representing a priority of a capacitive input at discrete locations across the capacitive touch sensor 110 and define a second weight gradient representing a priority of a pressure input at discrete locations across the pressure sensor 120. For example, the computing device: can define the first capacitance weight gradient of capacitance thresholds increasing from a center of the capacitive touch sensor 110 toward an edge of the capacitive touch sensor; and can define the first pressure weight gradient of pressure thresholds decreasing from a center of the pressure sensor 120 toward an edge of the pressure sensor 120.

Then the system 100 can read a sequence of capacitance value images from the capacitive touch sensor 110 at a first scan rate, wherein each capacitance value image includes capacitance values at each capacitive sense electrode 116 in the capacitive touch sensor 110 during a corresponding scan period. The system 100 can also read a sequence of pressure value images from the pressure sensor 120 at a second scan rate greater than the first scan rate, wherein each pressure value image includes resistance values at each resistive sense electrode 126 in the pressure touch sensor during a corresponding scan period. By mapping the first capacitance gradient to the first capacitance value image, the system 100 can generate a first capacitance touch image representing locations of disturbances in capacitance greater than capacitance thresholds assigned to regions across the capacitive touch sensor 110 by the first capacitance gradient. By mapping the first pressure gradient to a first pressure value image, recorded at approximately the first time, the system 100 can generate a first pressure touch image representing locations and magnitudes of disturbances in applied pressures greater than pressure thresholds assigned to regions across the pressure sensor 120 by the first pressure gradient. The system 100 can then merge the first input and the second input into the confirmed touch input and generate the first touch image by calculating a linear combination of the first capacitance touch image, weighted according to the first weight gradient, and the first pressure touch image, weighted according to the second weight gradient and geometrically aligned to the first capacitance touch image, to generate the first touch image. In particular, if the combination of a first input, represented in the first capacitance touch image and weighted according to a corresponding weight in the first weight gradient, and a first pressure, represented in a first pressure touch image and weighted according to a corresponding weight in the second weight gradient, exceeds a preset static threshold, the system 100 can write detection (and confirmation) of an input on the touch sensor surface 150 to a corresponding position within the first touch image.

8. Situational Gradients

In the foregoing variations of method S100, weight gradients and threshold gradient can be applied across the touch sensor surface 150 in response to situations and environments that dictate types of inputs to the touch sensor surface 150 and efficacy of particular sensors in detecting each type of input to the touch sensor surface 150.

In one example, the system 100 can apply threshold gradients various sensors in order to improve detection and confirmation of an input near an edge. In this example, detection of inputs near an edge of a touch sensor surface 150 by a capacitive touch sensor 110 may be less accurate (e.g., due to a beveled edge of the touch sensor surface) as capacitance values near the edge may be inaccurate, inconsistent, or subject to greater noise. Thus, the system 100 can apply a threshold gradient across the capacitive touch sensor, including increasing capacitance thresholds (i.e., decreasing sensitivity) near the edge of the capacitive touch sensor 110 and gradually decreasing the capacitance threshold (i.e., increasing sensitivity) toward the center of the touch sensor. Likewise, the system 100 can apply a threshold gradient to the pressure sensor, including decreasing pressure thresholds near the edge of the pressure sensor 120 and increasing pressure thresholds near the center of the device such that inputs detected near the edge of the touch sensor surface 150 are primarily identified based on deviations in applied pressure detected by the pressure sensor 120—rather than based on deviations in local capacitance detected by the capacitive touch sensor 110—in order to accommodate inaccuracies in detected capacitance values proximal the edge of the touch sensor surface 150.

In another example, the system 100 includes a phone containing an integrated touchscreen. While the device is placed flat on a table (as opposed to being held by a user in an elevated position), the capacitive touch sensor 110 may be less effective in detecting capacitive inputs because the capacitive touch sensor 110 is not grounded to a user who may depressed the screen of the device with her finger. Because the system is not grounded to the user, lack of a common ground plane between the user and the system 100 may yield little characterizable and repeatable change in capacitance values recorded by the capacitive touch sensor 110. However, the system can detect that the device is not grounded due to fluctuations in capacitance values recorded by the touch sensor over a duration of time and/or determine that the system 100 is lying flat on a table based on outputs of an accelerometer integrated in the system 100. Accordingly, the system 100 can increase a weight applied to pressure values detected by the pressure sensor 120 across a length and width of the pressure sensor 120 and decrease a weight applied to capacitance values detected by the capacitive touch sensor 110, thereby enabling the system 100 to detect inputs on the touch sensor surface 150 predominantly through the pressure sensor 120 when current usage of the system 100 reduces efficacy of the capacitive touch sensor 110 in detecting inputs on the touch sensor surface 150.

In another example, the system 100 can be integrated into a phone including a touchscreen. When the device is placed in a user's pocket with the touchscreen in contact with a leg of the user, the capacitive touch sensor 110 can be saturated with in light of large changes to capacitance values reach by each sense electrode 116 in the capacitive touch sensor 110. !The system 100 can detect these high capacitive values across sense electrodes 116 in the capacitive touch sensor 110 and then determine that the device currently occupying a pocket of the user based on such saturation of the capacitive touch sensor 110 and/or outputs of other sensors in the system 100. The system 100 can then decrease the weight assigned to capacitance inputs detected by the capacitive touch sensor; and increase the weight assigned to pressure inputs detected by the pressure sensor 120, thereby prioritizing pressure inputs detected across the touch sensor surface 150 over concurrent capacitive inputs detected by the capacitive touch sensor 110 due to broad saturation of the capacitive touch sensor 110, which otherwise limits efficacy of the capacitive touch sensor 110 in reliably detecting inputs on the touch sensor surface 150.

Furthermore, the capacitive touch sensor 110 may therefore be ineffective in detecting capacitive inputs due to saturation for a duration of time succeeding removal of the device from the user's pocket, though the capacitive touch sensor 110 may recover over a subsequent period of time as more effective baseline capacitance values are calculated by the capacitive touch sensor 110. Therefore, the system 100 can slowly shift the increased weight applied to the pressure inputs and the reduced weights applied to capacitive inputs back toward initial or default weights as capacitive touch sensor 110 recovers from saturation, thereby enabling the system 100 to detect inputs on the touch sensor surface 150 predominantly via the pressure sensor 120 immediately after the system 100 is removed from the user's pocket.

In another example, the system 100 can respond and compensate for electrical noise, such as from moisture present on the touch sensor surface 150 or electrical noise generated by an electrical cable during charging of the device. In this example, the electrical noise can interfere with capacitance values read by the capacitive touch sensor 110. Thus, the system 100 can de-weight the capacitive touch sensor 110 (i.e., turn the capacitive touch sensor 110 off entirely) and decrease the pressure threshold to enable the system 100 to detect lower pressure inputs at the pressure sensor 120 during system periods of operation.

9. Defect Detection

In one variation of the method shown in FIGS. 7 and 9, the system 100: detects presence of an input at a start location over a touch sensor surface 150 through a capacitive touch sensor 110 at a first time in Block S142; detects a transition of the input from the start location, through an intermediate location, to an end location over a contiguous path on the touch sensor surface 150 over a duration of time, the end location offset from the start location, the duration of time terminating at a second time succeeding the first time in Block S144; through a pressure sensor 120 coupled to the capacitive touch sensor: detects a start pressure applied to the touch sensor surface 150 proximal the start location at approximately the first time in Block S152; detects an intermediate pressure applied to the touch sensor surface 150 proximal the intermediate location in Block S154; detects an end pressure applied to the touch sensor surface 150 proximal the end location at approximately the second time in Block S156; detects a discontinuity in magnitude of pressure applied to the touch sensor surface 150 proximal the intermediate location based on the start pressure, the intermediate pressure, and the end pressure in Block S172; in response to detecting the discontinuity: associates a first region of the pressure sensor 120 adjacent the intermediate location with a mechanical defect in Block S174; increases a first weight assigned to inputs detected through the capacitive touch sensor 110 proximal the intermediate location in Block S176; and decreases a second weight assigned to pressures detected by the pressure sensor 120 proximal the intermediate location in Block S178; and at a third time, confirms a second input proximal the intermediate location based on the second input detected by the capacitive touch sensor 110 weighted according to the first weight and based on a second pressure detected by the pressure sensor 120 proximal the intermediate location weighted according to the second weight in Block S110. Generally, this variation of the method S100 functions to detect defects in sensors of the system 100 and compensate for said defects by prioritizing (or weighting) other sensors coincident the defect over the defective sensor or reducing the threshold of the other sensors coincident the defect such that other sensors, coincident the defect, are more sensitive to inputs over the defective area where the defective sensor is less sensitive to inputs.

In particular, the system 100 can detect and compensate for defects in any of the sensors in the system 100. Defects can include damaged resistive sense electrodes 126 and/or drive electrodes 128 in the pressure sensor 120, damaged resistive sense electrodes 116 and/or drive electrodes 118 in the capacitive touch sensor 110 (e.g., "dropped" rows and columns—or "lines"—of capacitive sense electrodes), obstructions to optical sensors 160 integrated within pixels of a display, etc. In this variation, Blocks S172 and S174 function to detect the discontinuity and characterize the defect as a defect while Blocks S176 and S178 function to compensate for the defect.

To detect a discontinuity in capacitive and/or pressure values read by the capacitive touch sensor 110 and the pressure sensor 120, the system 100 can calculate an anticipated value and compare actual read values to the anticipated values. For example, to calculate the anticipated pressure at a particular location, the system 100 can interpolate between a first pressure and a second pressure both adjacent the particular location. To detect the discontinuity proximal the particular location, the system 100 can compare the actual pressure detected at the particular location with the anticipated pressure for the particular location. In response to a difference between the anticipated pressure and the actual pressure, the system 100 can confirm a (mechanical) defect at or near the particular location. As a result, the system 100 can compensate for the defect by decreasing capacitance thresholds near the particular location or increasing weights of capacitive values detected by the capacitive touch sensor 110 near the particular location. Likewise, the system 100 can de-weight or nullify any pressure inputs detected near the particular location.

In one implementation of this variation of the method S100, the system 100 can apply a weighting gradient coincident and surrounding a defect. In this implementation, the system 100 can define the first region that encompasses and is offset from the intermediate location over which pressures detected by the pressure sensor 120 diminish toward the intermediate pressure; and assign a second weight gradient to the pressure sensor 120 increasing outwardly from a center of the first region toward an edge of the expanded region; and assign a first weight gradient to the capacitive touch sensor 110 coincident the expanded region decreasing outwardly from the center of the expanded region coincident the intermediate location toward the edge of the expanded region.

9.1 Defect Examples

One example of the discontinuity of the foregoing variation described above includes a dropped line or column in a capacitive touch sensor 110 array. In this example, an entire row and column of capacitive sense electrodes 116 can be damaged and unable to detect capacitance values. In this example, the system 100 can detect the dropped line by detecting a transition of an input from a start location, through an intermediate location, to an end location over a contiguous path on the touch sensor surface 150 and detecting a discontinuity in capacitance values on the touch sensor surface 150 occurring proximal a first column of sense electrodes 116 in the capacitive touch sensor 110 proximal the intermediate location. In response to detecting the discontinuity, the system 100 can detect a defect in the capacitive touch sensor 110 along the first column of sense electrodes; decrease a weight assigned to inputs detected through the capacitive touch sensor 110 along the first column of sense electrodes; and increase a weight assigned to pressures detected by the pressure sensor 120 in a region of the pressure sensor 120 coinciding with the first column. For future inputs to the system 100, the system 100 can confirm an input proximal the intermediate location based on presence of the input detected by the capacitive touch sensor 110 weighted according to the first (e.g., low or null) weight and based on pressure of the input detected by the pressure sensor 120 weighted according to the second (e.g., high) weight.

In another implementation, the system 100 can detect and compensate for defects in the pressure sensor 120, such as a bubble formed between the pressure sensor 120 and the display 190 or an ineffective resistive sense electrode 126 damaged by a shock to the computing device. For example, the system 100 can decrease the weight of the applied pressure values detected by the pressure sensor 120 proximal the defect to null and can confirm future input by relying on capacitive inputs.

In another implementation, the capacitive touch sensor 110 and the pressure sensor 120 can be positionally misaligned during manufacture of the system 100. For example, sense electrodes in the capacitive touch sensor 110 can be laterally and/or longitudinally offset from corresponding sense electrodes in the pressure sensor 120 during assembly of the capacitive touch sensor 110 and the pressure sensor 120, such as by lamination. Therefore, the system 100 can execute a calibration routine to determine vertical alignment between and to thus pair sense electrodes in the capacitive touch sensor 110 and in the pressure sensor 120. For example, during the calibration routine (e.g., during manufacture of the system 100), the capacitive touch sensor 110 can detect a capacitive input proximal a first location based on a change in capacitance at a first capacitive sense electrode (or first cluster of capacitive sense electrodes) proximal the first location; substantially simultaneously, the pressure sensor 120 can detect a pressure input proximal the first location based on a change in resistance at a first resistive sense electrode (or first cluster of resistive sense electrodes) known to be positioned near the first location. The system 100 can thus link the capacitance input and the pressure input—based on their time proximities and location proximities (e.g., less than a preset threshold offset)—and calculate a calibration transform that maps the position of the first capacitive sense electrode to the position of the first resistive sense electrode accordingly. The system 100 can repeat this process for inputs at other locations over touch sensor surface 150—such as applied to the touch sensor surface 150 by an automated scanning robot that draws a mechanical detent along a boustrophedonic path or at known locations across the touch sensor surface 150—to populate the calibration transform with additional values that map capacitive sense electrodes at other positions in the capacitive touch sensor 110 to other resistive sense electrodes in the resistive pressure sensor 120. The system can also interpolate between linked capacitance and pressure inputs on the touch sensor surface 150 to complete the calibration transform for mapping each capacitive sense electrode to one (or a group of) resistive sense electrodes in the system 100. The system 100 can later implement this calibration transform to align capacitive value images and pressure touch images, as described above. Thus, the system 100 can confirm an input proximal a particular location of the touch sensor surface 150—despite a location of an input indicated by the capacitive touch sensor 110 differing from an input location indicated by the pressure sensor 120—by mapping (e.g., translating, rotating, and/or scaling) positions of capacitance sense electrodes in the capacitive touch sensor 150 to positions of resistance sense electrodes in the pressure sensor 120 according to the calibration transform, thereby compensating for misalignment between the capacitive touch sensor 110 and the pressure sensor 120.

10. Additional Sensors

The system 100 implementing the method S100, can also include additional sensors, such as an accelerometer and optical sensors 160 integrated into each pixel of a display. Additional sensors can function to provide context to environments and inform expected sensor thresholds at particular locations of the touch sensor surface 150. For example, an accelerometer can function to detect vibration and drop events of a device including a capacitive touch sensor 110 and a pressure sensor 120 arranged behind a touch sensor surface 150. In this example, vibration, such as from a car bouncing down a gravel road, may limit the precision with which a user may place an input on the touch sensor surface 150 of the device while within the car. Blocks of the method S100, can implement information from the accelerometer about the magnitude and frequency of the vibration event to increase pressure thresholds of the pressure sensor 120 and substantially increase capacitance thresholds of the capacitive touch sensor 110 (or turn off the capacitive touch sensor). By increasing thresholds of the pressure sensor 120, a user may apply more pressure to the touch sensor surface 150 in order for the system 100 to detect and confirm the input. By decreasing thresholds of the capacitive touch sensor 110, the system 100 can prevent accidental taps by a finger of the user on the touchscreen from being read and confirmed as an input; instead aberrant events, such as an incidental tap or placement of a finger, can be read below the capacitance threshold defined by the capacitive gradient and ignored by the system 100.

Alternatively, data from additional sensors can function to inform weights assigned to inputs from each type of sensor in the system 100 as described in Blocks S176 and S178. In the foregoing example, vibration detected by the accelerometer can function to redefine weighting of pressure inputs and capacitance inputs detected by the pressure sensor 120 and the capacitive touch sensor 110, respectively, as the pressure input and the capacitive input are merged in the confirmed touch image of Block S170. In response to vibration detected by the accelerometer, the system 100 can increase a weight of inputs detected by the pressure sensor 120 (e.g., to 99% of the confirmed touch image) and decrease a weight of the inputs detected by the capacitive touch sensor 110 (e.g., to 1% of the confirmed touch image) in the confirmed touch image. Thus, if the capacitive touch sensor 110 detects an input exceeding the capacitance threshold defined by the capacitance gradient but the pressure, at substantially the same time, detects an absence of an input, the system 100 can combine the absence of the pressure input, weighted at 99% percent of the confirmed touch image, with the capacitive input, weighted at 1% of the confirmed touch image, to generate the confirmed touch image representing a confirmed touch input of a magnitude of 1% of the capacitance value of the capacitive input.

The systems and methods described herein can be embodied and/or implemented at least in part as a machine configured to receive a computer-readable moderate storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable moderate storing computer-readable instructions. The instructions can be executed by computer-executable components integrated by computer-executable components integrated with apparatuses and networks of the type described above. The computer-readable moderate can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
   through a capacitive touch sensor:
      detecting presence of an input at a start location over a touch sensor surface at a first time;
      detecting a transition of the input from the start location, through an intermediate location, to an end location over a contiguous path on the touch sensor surface over a duration of time, the end location offset from the start location, the duration of time terminating at a second time succeeding the first time;
   through a pressure sensor coupled to the capacitive touch sensor:
      detecting a start pressure applied to the touch sensor surface proximal the start location at approximately the first time;
      detecting an intermediate pressure applied to the touch sensor surface proximal the intermediate location;
      detecting an end pressure applied to the touch sensor surface proximal the end location at approximately the second time;
   detecting a discontinuity in magnitude of pressure applied to the touch sensor surface proximal the intermediate location based on the start pressure, the intermediate pressure, and the end pressure;
   in response to detecting the discontinuity:
      associating a first region of the pressure sensor adjacent the intermediate location with a mechanical defect;

increasing a first weight assigned to inputs detected through the capacitive touch sensor proximal the intermediate location; and decreasing a second weight assigned to pressures detected by the pressure sensor proximal the intermediate location; and at a third time, confirming a second input proximal the intermediate location based on the second input detected by the capacitive touch sensor weighted according to the first weight and based on a second pressure detected by the pressure sensor proximal the intermediate location weighted according to the second weight.

2. The method of claim 1:

further comprising:

through the capacitive touch sensor, detecting presence of a third input proximal a third location at an initial time preceding the first time, the third location distinct from the intermediate location;

through the pressure sensor, detecting a third pressure proximal the third location at approximately the initial time;

at approximately the initial time, confirming the third input proximal the third location based on the third input detected by the capacitive touch sensor proximal the third location weighted according to a third weight and based on the third pressure detected by the pressure sensor proximal the third location weighted according to a fourth weight;

wherein increasing the first weight comprises increasing the first weight from equal to the third weight to greater than the third weight; and wherein decreasing the second weight comprises decreasing the second weight from equal to the fourth weight to less than the fourth weight.

3. The method of claim 1:

wherein decreasing the second weight comprises reducing the second weight for pressures detected by the pressure sensor within the first region to null in response to associating the first region of the pressure sensor with the mechanical defect; and wherein confirming the second input comprises identifying the second input proximal the intermediate location based on the second input detected by the capacitive touch sensor.

4. The method of claim 1, wherein detecting the discontinuity in applied pressure comprises:

calculating an anticipated pressure at the intermediate location by interpolating between the start pressure proximal the start location and the end pressure proximal the end location; and detecting the discontinuity proximal the intermediate location based on a difference between the intermediate pressure and the anticipated pressure exceeding a threshold difference.

5. The method of claim 1, further comprising:

through the capacitive touch sensor:

detecting presence of a third input at a second start location over the touch sensor surface at a third time, the second start location distinct from the start location;

detecting a second transition of the third input from the second start location, to proximal the intermediate location, to a second end location over a second contiguous path on the touch sensor surface over a second duration of time, the second end location offset from the second start location, the second duration of time terminating at a fourth time succeeding the third time;

through the pressure sensor coupled to the capacitive touch sensor:

detecting a second start pressure applied to the touch sensor surface proximal the second start location at approximately the third time;

detecting a second intermediate pressure applied to the touch sensor surface proximal the intermediate location;

detecting a second end pressure applied to the touch sensor surface proximal the second end location at approximately the fourth time; and detecting a second discontinuity in magnitude of applied pressure on the touch sensor surface proximal the intermediate location based on the second start pressure, the second intermediate pressure, and the second end pressure;

in response to the second discontinuity coinciding with the discontinuity, confirming the mechanical defect in the first region of the pressure sensor.

6. The method of claim 1:

wherein detecting presence of the input comprises detecting presence of the input through the capacitive touch sensor arranged over a display and spanning a width and a height of the display; and wherein detecting the start pressure comprises detecting the start pressure at the pressure sensor comprising a resistive pressure sensor arranged coupled to the display opposite the capacitive touch sensor and spanning the width and the height of the display.

7. The method of claim 1:

wherein associating the first region of the pressure sensor adjacent the intermediate location with the mechanical defect comprises defining the first region that encompasses and is offset from the intermediate location over which pressures detected by the pressure sensor diminish toward the intermediate pressure; and wherein assigning the second weight to the pressure sensor comprises assigning a second gradient weight to the pressure sensor increasing outwardly from a center of the first region toward an edge of the expanded region.

8. The method of Claim 7, wherein assigning the first weight to the capacitive touch sensor proximal the intermediate location comprises assigning a first gradient weight to the capacitive touch sensor coincident the expanded region decreasing outwardly from the center of the expanded region coincident the intermediate location toward the edge of the expanded region.

9. The method of claim 1, further comprising:

through the capacitive touch sensor:

detecting presence of a second input at a second start location over the touch sensor surface at a third time;

detecting a second transition of the second input from the second start location, through a second intermediate location, to a second end location over a second contiguous path on the touch sensor surface;

detecting a second discontinuity in capacitance values on the touch sensor surface occurring proximal a first column of sense electrodes in the capacitive touch sensor proximal the second intermediate location;

in response to detecting the second discontinuity:

detecting a defect in the capacitive touch sensor along the first column of sense electrodes;

decreasing a third weight assigned to inputs detected through the capacitive touch sensor along the first column of sense electrodes; and increasing a fourth weight assigned to pressures detected by the pressure sensor in a second region of the pressure sensor proximal the first column; and at a fourth time, confirming a second input proximal the intermediate location based on presence of the second input detected by the capacitive touch sensor weighted according to the first weight and based on pressure of the second input detected by the pressure sensor weighted according to the second weight.

10. The method of claim 1:

wherein increasing the first weight comprises:
generating a capacitive weight image of the capacitive touch sensor representing weights assigned to inputs detected at discrete locations of the capacitive touch sensor, the capacitive weight image defining the first weight proximal the intermediate location; and
in response to detecting the discontinuity, locally increasing the first weight, in the capacitive weight image, corresponding to an area of the capacitive touch sensor coinciding with the intermediate location;

wherein decreasing the second weight comprises:
generating a pressure weight image of the pressure sensor representing weights assigned to pressures detected through the pressure sensor, the pressure weight image defining the second weight proximal the intermediate location; and
in response to detecting the discontinuity, locally decreasing the second weight, in the pressure weight image, corresponding to an area of the pressure sensor coinciding with the intermediate location;

wherein confirming the second input at the third time comprises:
recording a capacitive touch image representing the second input detected proximal the intermediate location at the third time;
recording a pressure image representing the second pressure detected proximal the intermediate location at approximately the third time;
generating a touch image representing the second input proximal the intermediate location by merging the capacitive touch image and the pressure image according to the capacitive weight image and according to the pressure weight image, respectively; and
outputting the touch image to a computing device coupled to the capacitive touch sensor and the pressure sensor.

11. The method of claim 1, further comprising:
assigning a first sensitivity threshold to a capacitive sense electrode in the capacitive touch sensor proximal the intermediate location; and
assigning a second sensitivity threshold to a pressure sense electrode in the pressure sensor proximal the intermediate location;

wherein, at the third time, confirming the second input proximal the intermediate location comprises:
at the capacitive sense electrode, registering a capacitance event exceeding the first sensitivity threshold as a capacitive input;
at the pressure sense electrode, registering a pressure event exceeding the second sensitivity threshold as a pressure input;

calculating a linear combination of the capacitive input, weighted according to the first weight, and the pressure input, weighted according to the second weight, to detect a second input value; and
generating a touch image representing the second input value.

12. A method comprising:

defining a first capacitance gradient of capacitance thresholds spanning a sense array of a capacitive touch sensor;
defining a first pressure gradient of pressure thresholds spanning a sense array of a pressure sensor coupled to the capacitive touch sensor;

through the capacitive touch sensor:
reading a first capacitance value from a first capacitive sense electrode in the sense array of the capacitive touch sensor proximal a first location on a touch sensor surface at a first time;
detecting presence of a first input on the touch sensor surface at the first location at the first time in response to the first capacitance value exceeding a first capacitance threshold assigned to the capacitive touch sensor proximal the first location by the first capacitance gradient;

through the pressure sensor:
reading a second pressure value from a first pressure sense electrode in the sense array of the pressure sensor proximal the first location on the touch sensor surface at approximately the first time;
detecting presence of a second input on the touch sensor surface proximal the first location at approximately the first time in response to the second pressure value exceeding a first pressure threshold assigned to the pressure sensor proximal the first location by the first pressure gradient;

in response to detecting the first input at the first location at the first time and detecting the second input proximal the first location at approximately the first time:
merging the first input and the second input into a confirmed touch input proximal the first location on the touch sensor surface;
generating a first touch image representing the first location and the second pressure value of the confirmed touch input; and
outputting the first touch image to a computing device at approximately the first time.

13. The method of claim 12:

wherein defining the first capacitance gradient of capacitance thresholds comprises defining the first capacitance gradient of capacitance thresholds increasing from a center of the capacitive touch sensor toward an edge of the capacitive touch sensor; and
wherein defining the first pressure gradient of pressure thresholds comprises defining the first pressure gradient of pressure thresholds decreasing from a center of the pressure sensor toward an edge of the pressure sensor.

14. The method of claim 12:

wherein detecting presence of the first input on the touch sensor surface comprises detecting presence of the first input on the touch sensor surface in response to the first capacitance value differing from a baseline capacitance value, calculated for the first time, by more than the first capacitance threshold;
wherein reading the second pressure value comprises reading a second resistance value across the first pressure sense electrode and a first drive electrode in the sense array of the pressure sensor proximal the first location on the touch sensor surface; and wherein detecting presence of the second input on the touch sensor surface comprises detecting presence of the second input on the touch sensor surface in response to the second pressure value differing from a baseline resistance value, calculated for the first time, by more than the first pressure threshold.

15. The method of claim 12:

further comprising:
at an initial time preceding the first time, detecting an approach of the first input in response to an increase in an initial capacitance value proximal the first location;
confirming presence of the approach of the first input at approximately the initial time proximal the first location based on a first optical value read from an optical sensor, coupled to the capacitive touch sensor, at approximately the initial time;
generating an initial touch image representing the approach of the first input;

wherein merging the first input and the second input into the confirmed touch input comprises confirming the first location of the first input at approximately the first time based on a second optical value read from the optical sensor at approximately the first time and based on the second input detected by the pressure sensor at approximately the first time; and wherein generating the first touch image comprises writing a magnitude of the second input, detected by the pressure sensor proximal the first location at approximately the first time, to the confirmed touch input represented in the first touch image.

16. The method of claim 12, further comprising:

reading a third capacitance value from a third capacitive sense electrode in the capacitive touch sensor proximal a third location on a touch sensor surface at a third time;
detecting presence of a third input on the touch sensor surface at the third location proximal an edge of the touch sensor surface in response to the third capacitance value, corresponding to the third input, exceeding a third capacitance threshold assigned to the capacitive touch sensor proximal the third location;
reading a third pressure value from a third pressure sense electrode proximal the third location at approximately the third time;
detecting absence of a fourth input on the touch sensor surface proximal the third location in response to the third pressure value remaining below a third pressure threshold assigned to the pressure sensor proximal the third location;
characterizing the third input as an aberrant input in response to detecting absence of the fourth input on the touch sensor surface proximal the third location;
generating a second touch image omitting the aberrant input; and
outputting the second touch image to the computing device at approximately the third time.

17. The method of claim 12:

wherein reading the first capacitance value comprises reading a sequence of capacitance value images from the capacitive touch sensor at a first scan rate, each capacitance value image comprising capacitance values at each capacitive sense electrode in the capacitive touch sensor during a corresponding scan period;
wherein reading the first pressure value comprises reading a sequence of pressure value images from the pressure sensor at a second scan rate greater than the first scan rate, each pressure value image comprising resistance values at each pressure sense electrode in the pressure touch sensor during a corresponding scan period;
wherein detecting presence of the first input on the touch sensor surface at the first location at the first time comprises:
extrapolating a first capacitance value image aligned to the first time from a set of capacitance value images preceding the first time, the first capacitance value image comprising the first capacitance value; and
mapping the first capacitance gradient to the first capacitance value image to generate a first capacitance touch image representing locations of disturbances in capacitance greater than capacitance thresholds assigned to regions across the capacitive touch sensor by the first capacitance gradient;
wherein detecting presence of the second input on the touch sensor surface proximal the first location at approximately the first time comprises:
mapping the first pressure gradient to a first pressure value image, recorded at approximately the first time, to generate a first pressure touch image representing locations and magnitudes of disturbances in applied pressures greater than pressure thresholds assigned to regions across the pressure sensor by the first pressure gradient; and
wherein merging the first input and the second input into the confirmed touch input and generating the first touch image comprise calculating a linear combination of the first capacitance touch image and the first pressure touch image, geometrically aligned to the first capacitance touch image, to generate the first touch image.

18. The method of claim 12:

further comprising:
defining a first weight gradient representing a priority of a capacitive input at discrete locations across the capacitive touch sensor;
defining a second weight gradient representing a priority of a pressure input at discrete locations across the pressure sensor; and
wherein reading the first capacitance value comprises reading a sequence of capacitance value images from the capacitive touch sensor at a first scan rate, each capacitance value image comprising capacitance values at each capacitive sense electrode in the capacitive touch sensor during a corresponding scan period;
wherein reading the first pressure value comprises reading a sequence of pressure value images from the pressure sensor at a second scan rate greater than the first scan rate, each pressure value image comprising resistance values at each pressure sense electrode in the pressure touch sensor during a corresponding scan period;
wherein detecting presence of the first input on the touch sensor surface at the first location at the first time comprises mapping the first capacitance gradient to the first capacitance value image to generate a first capacitance touch image representing locations of disturbances in capacitance greater than capacitance thresholds assigned to regions across the capacitive touch sensor by the first capacitance gradient;
wherein detecting presence of the second input on the touch sensor surface proximal the first location at approximately the first time comprises mapping the first pressure gradient to a first pressure value image, recorded at approximately the first time, to generate a first pressure touch image representing locations and magnitudes of disturbances in applied pressures greater than pressures thresholds assigned to regions across the pressure sensor by the first pressure gradient; and wherein merging the first input and the second input into the confirmed touch input and generating the first touch image comprise calculating a linear combination of the first capacitance touch image, weighted according to the first weight gradient, and the first pressure touch image, weighted according to the second weight gradient and geometrically aligned to the first capacitance touch image, to generate the first touch image.

19. The method of claim 18, further comprising:

detecting a transition of a third input from the first location, through an intermediate location, to an end location over a contiguous path on the touch sensor surface over a duration of time, the end location offset from the first location, the duration of time terminating at a third time succeeding the first time;

through the pressure sensor:
  detecting a start pressure value applied to the touch sensor surface proximal the first location at approximately the first time;
  detecting an intermediate pressure value applied to the touch sensor surface proximal the intermediate location;
  detecting an end pressure value applied to the touch sensor surface proximal the end location at approximately the third time;

detecting a discontinuity in applied pressure on the touch sensor surface occurring proximal the intermediate location based on the start pressure value, the intermediate pressure value, and the end pressure value;

in response to detecting the discontinuity:
  associating a first region of the pressure sensor adjacent the intermediate location with a mechanical defect;
  assigning a first weight to the capacitive touch sensor proximal the intermediate location based on the first weight gradient; and
  assigning a second weight, less than the first weight, to the pressure sensor proximal the intermediate location based on the second weight gradient; and at a fourth time, confirming a third input proximal the intermediate location based on presence of the third input detected by the capacitive touch sensor weighted according to the first weight and based on pressure of the third input detected by the pressure sensor weighted according to the second weight.

20. The method of claim 12:

wherein reading the first capacitance value comprises reading a sequence of capacitance value images from the capacitive touch sensor at a first scan rate, each capacitance value image comprising capacitance values at each capacitive sense electrode in the capacitive touch sensor during a corresponding scan period;

further comprising, in response to fluctuation of capacitance values among each capacitance value image in the sequence of capacitance value images over the corresponding scan period:
  locating the computing device resting flat on a table;
  increasing capacitance thresholds assigned regions across the capacitive touch sensor by the first capacitance gradient; and
  decreasing pressure thresholds assigned regions across the capacitive touch sensor by the first pressure gradient.

21. The method of claim 12:

further comprising:
  defining a capacitance weight for each capacitive sense electrode in the capacitive touch sensor representing a priority of capacitive inputs detected at each capacitive sense electrode;
  defining a pressure weight for each pressure sense electrode in the pressure sensor representing a priority of pressure inputs detected at each pressure sense electrode;

wherein reading the first capacitance value comprises reading a sequence of capacitance value images from the capacitive touch sensor at a first scan rate, each capacitance value image comprising capacitance values at each capacitive sense electrode in the capacitive touch sensor during a corresponding scan period;

further comprising, in response to high capacitance values exceeding capacitance thresholds assigned regions across the capacitive touch sensor by the first capacitance gradient across each capacitance value image in the sequence of capacitance value images over the corresponding scan period:
  locating the computing device within a pocket of a user;
  decreasing the capacitance weight for each capacitive sense electrode in the capacitive touch sensor, deprioritizing capacitive inputs detected across the capacitive touch sensor; and
  increasing the pressure weight for each pressure sense electrode in the pressure sensor, prioritizing capacitive inputs detected across the pressure sensor over concurrent capacitive inputs detected across the capacitive touch sensor;

wherein detecting presence of the first input on the touch sensor surface at the first location at the first time comprises generating a first capacitance touch image representing locations of disturbances in capacitance greater than capacitance thresholds assigned to regions across the capacitive touch sensor by the first capacitance gradient;

wherein detecting presence of the second input on the touch sensor surface proximal the first location at approximately the first time comprises generating a first pressure touch image representing locations and magnitudes of disturbances in applied pressures greater than pressure thresholds assigned to regions across the pressure sensor by the first pressure gradient; and wherein merging the first input and the second input into the confirmed touch input and generating the first touch image comprises calculating a linear combination of the first capacitance touch image, weighted according to the capacitance weight assigned to capacitive inputs proximal the first location, and the first pressure touch image, weighted according to pressure weight assigned to pressure input proximal the first location.

* * * * *